(12) United States Patent
Cao

(10) Patent No.: US 8,509,617 B2
(45) Date of Patent: Aug. 13, 2013

(54) NODE, DATA PROCESSING SYSTEM, AND DATA PROCESSING METHOD

(75) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 12/981,129

(22) Filed: Dec. 29, 2010

(65) Prior Publication Data

US 2011/0097090 A1 Apr. 28, 2011

Related U.S. Application Data

(63) Continuation of application No. PCT/CN2009/072548, filed on Jun. 30, 2009.

(30) Foreign Application Priority Data

Jun. 30, 2008 (CN) .......................... 2008 1 0128215

(51) Int. Cl.
*H04J 14/00* (2006.01)

(52) U.S. Cl.
USPC .................................. 398/47; 398/50; 398/52

(58) Field of Classification Search
USPC ........................................ 398/45–56
See application file for complete search history.

(56) References Cited

U.S. PATENT DOCUMENTS

| | | | |
|---|---|---|---|
| 6,963,564 B1 * | 11/2005 | Liu | 370/389 |
| 7,630,363 B2 * | 12/2009 | Den Hollander et al. | 370/375 |
| 7,835,649 B2 * | 11/2010 | Epps et al. | 398/155 |
| 2002/0118421 A1 | 8/2002 | Xiong et al. | |
| 2003/0016671 A1 | 1/2003 | Johnston | |
| 2004/0071468 A1 | 4/2004 | Doh et al. | |
| 2005/0078684 A1 | 4/2005 | Wolf et al. | |
| 2005/0135806 A1 * | 6/2005 | Mishra et al. | 398/45 |

FOREIGN PATENT DOCUMENTS

| | | |
|---|---|---|
| CN | 1625150 A | 6/2005 |
| CN | 1816018 A | 8/2006 |
| WO | WO 2008/072819 A1 | 6/2008 |
| WO | WO 2010/000200 A1 | 1/2010 |

OTHER PUBLICATIONS

Office Action issued in corresponding Chinese Patent Application No. 200810128215.6, mailed Aug. 3, 2012.

(Continued)

*Primary Examiner* — Dzung Tran
(74) *Attorney, Agent, or Firm* — Brinks Hofer Gilson & Lione

(57) ABSTRACT

A node, a data processing system, and a data processing method are provided. The node includes a control module, adapted to generate synchronization information and Optical Burst (OB) configuration information; at least one synchronization processing module, adapted to perform a synchronization process on OB paths at a plurality of wavelengths according to the synchronization information; and a cross-connection module, adapted to perform, a cross-connection process on the OB paths, on which the synchronization process has been performed. The data processing system includes at least two nodes, where the nodes are connected through OB paths at one or more wavelengths, and the nodes are adapted to transfer service data through the OB paths. The technical solutions can reduce volume, power consumption, and costs of the nodes, and avoid a problem of generation of data conflict on an optical layer due to lack of optical buffers in all optical switching.

12 Claims, 17 Drawing Sheets

| Power locking | Timing | Delimiting | Overhead | Payload |
|---|---|---|---|---|

(56) References Cited

OTHER PUBLICATIONS

Southwest Jiaotong University, "On Ethernet-Like Physical Frame Time-Slot Switching", Doctor Degree Dissertation. Classified Index TN 915.05.
Master Degree Dissertation of Chongqing University, Research on TWT Photonic Burst Network Architecture and Its QoS Control.
Extended European Search Report issued in corresponding European Patent Application No. 09771970.2, mailed Dec. 5, 2011.
Written Opinion of the International Searching Authority issued in corresponding PCT Patent Application No. PCT/CN2009/072548, mailed Oct. 15, 2009.
Office Action issued in corresponding Chinese Patent Application No. 200810128215.6, mailed Nov. 9, 2011.
Yuang et al., "Hopsman: An Experimental Testbed System for a 10-Gb/s Optical Packet-Switched WDM Metro Ring Network" IEEE Communications Magazine, Jul. 2008.
Puttasubbappa et al., "Quality of Service in an Optical Burst Switching Ring" Photonic Network Communications, vol. 9, No. 3, 2005.
Office Action issued in corresponding Chinese Patent Application No. 200810128215.6, mailed Apr. 18, 2012.
Office Action issued in corresponding European Patent Application No. 09771970.2, mailed Apr. 18, 2013.

\* cited by examiner

| Power locking | Timing | Delimiting | Overhead | Payload |

NODE, DATA PROCESSING SYSTEM, AND DATA PROCESSING METHOD

CROSS-REFERENCE TO RELATED APPLICATIONS

This application is a continuation of International Application No. PCT/CN2009/072548, filed on Jun. 30, 2009, which claims priority to Chinese Patent Application No. 200810128215.6, filed on Jun. 30, 2008, both of which are hereby incorporated by reference in their entireties.

FIELD OF THE TECHNOLOGY

The present invention relates to the field of communications, and more particularly to a node, a data processing system, and a data processing method.

BACKGROUND OF THE INVENTION

Nodes in a communications network may be divided into a source node, a destination node, and an intermediate node according to their functions. The source node is a node serving as a source for sending service data, the destination node is a node serving as a sink for receiving the service data, and the intermediate node is a node for forwarding the service data. In other words, the node to which service data is added may be called the source node, and the node at which the service data is dropped may be called the destination node. The communications network mainly includes a data communications network of an upper layer and a transport network of a lower layer. The communications network may be divided into a core network and a convergence network according to network topology structures, where a node located in the core network may be called a core node, and a node in the convergence network may be called an edge node. The core node mainly includes a core router in the data communications network of the upper layer, and a wavelength add/drop multiplexing device in the transport network of the lower layer. The edge node mainly includes an edge router in the data communications network of the upper layer, and a wavelength add/drop multiplexing device in the transport network of the lower layer. For example, the edge node and the code node in the communications network may respectively serve as the source node and the destination node when a service is added or dropped, and may serve as the intermediate node when no service is added or dropped. In the communications network, usually, the edge node serves the source node and the destination node, and the core node serves the intermediate node. As wideband services are developed and the number of wideband users increases, the network flow in the communications network exponentially increases, so that requirements on capacity and power consumption of the router in the node become increasingly higher. Currently, in order to support the transfer of the service data in the communications network, the capacity and the power consumption of the router have been developed to an unendurable extent, and the capital costs and operational costs are high. Therefore, it is a problem to be solved urgently how to reduce the capacity and the power consumption of the router in the node, that is, to reduce the capacity and the power consumption of the node, especially, the power consumption of the node.

In view of the problem, a solution is proposed in a first prior art. According to the first prior art, in the communications network, the node, especially, the core node, a wavelength cross-connection device or an Optical Transport Network (OTN) cross-connection device is adopted to replace the original wavelength add/drop multiplexing device. In the solution, when passing the node, the service data which is not locally dropped directly passes through a wavelength layer or an Optical Demultiplexer Unit (ODU) layer. As the electrical processing efficiency of the wavelength cross-connection device or the OTN cross-connection device of the node is high, the power consumption of the node, especially, the power consumption of the core node may be reduced in a certain degree in the technical solution of the first prior art.

In view of the problem, another solution is proposed in a second prior art, that is, an all-optical switching technology, for example, an Optical Burst Switching (OBS) technology. The main concept of the OBS technology is that Optical Burst (OB) paths and a control channel are physically separated, OB data and the control channel are respectively transferred, the node only performs an electrical process on the control channel, and reserves, according to information carried in the control channel, resources for the OB data being at hand, so that when passing the node, the OB data may be directly transferred and switched on the optical layer without an optical-to-electrical conversion, thereby simplifying an electrical processing procedure of the node, and reducing the power consumption of the node.

However, in the implementation of the present invention, the inventor finds that the prior art has at least the following problems.

In the technical solution of the first prior art, the granularity of the service data is large when passing through the wavelength layer or the ODU layer on the node, so that a bandwidth is excessively large when the nodes are connected by using the wavelength or the ODU path. When the nodes are connected by using the wavelength or the ODU path, it is equivalent to providing a direct path between the nodes, especially, the edge nodes. The number of the paths approximately has a square relation with the number of the nodes, and the square relation is as follows: $n*(n-1)/2$, where n is the number of routers in the node. When the node needs to be connected to more nodes, the number of the required paths is enormous, the number of the required connections is increased, and the node needs to provide more ports for connecting to more nodes, so that the volume, the power consumption, and the costs of the node are increased.

In the second prior art, although the power consumption of the node is reduced, the OBS lacks appropriate optical buffers, and thus a data conflict may easily occur on the optical layer when the data is transmitted in the OBS system.

SUMMARY OF THE INVENTION

The present invention is directed to a node, a data processing system, and a data processing method, capable of overcoming defects in the prior art that the volume of the node is large, the power consumption is heavy, the costs are high, and a data conflict is generated on the optical layer in all optical switching, so as to reduce the volume, the power consumption, and the costs of the nodes, and avoid the problem of generation of data conflict on the optical layer in all optical switching.

An embodiment of the present invention provides a node, which includes a control module, at least one synchronization processing module, and a cross-connection module.

The control module is adapted to generate synchronization information and OB configuration information.

The at least one synchronization processing module is adapted to perform a synchronization process on OB paths at one or more wavelengths according to the synchronization information.

The cross-connection module is adapted to perform, according to the OB configuration information, a cross-connection process on the OB paths, on which the synchronization process has been performed.

An embodiment of the present invention also provides a data processing system, which includes at least two nodes, where the nodes are connected by using OB paths at one or more wavelengths, and are adapted to transfer service data through the OB paths, and further adapted to perform a synchronization process and a cross-connection process on the OB paths bearing the service data at one or more wavelengths. The nodes include a control module, at least one synchronization processing module, and a cross-connection module.

The control module is adapted to generate synchronization information and OB configuration information.

The at least one synchronization processing module is adapted to perform the synchronization process on the OB paths at one or more wavelengths according to the synchronization information.

The cross-connection module is adapted to perform, according to the OB configuration information, the cross-connection process on the OB paths, on which the synchronization process has been performed.

An embodiment of the present invention further provides a data processing method, which includes the following steps. Synchronization information and OB configuration information are generated. A synchronization process is performed on OB paths at one or more wavelengths according to the synchronization information. A cross-connection process is performed, according to the OB configuration information, on the OB paths, on which the synchronization process has been performed.

In the technical solutions of the present invention, by dividing a plurality of OB paths on a wavelength, service data may be transferred between the nodes of the data processing system through the OB paths, thereby reducing the connection bandwidth between the nodes. A plurality of OB paths may exist on a port or ports of the node, so that the node may be connected to more nodes through a plurality of OB paths, thereby increasing the number of available connections of the node. Meanwhile, for one node, in a situation of having the same number of connections, the number of the ports of the node may be reduced, thereby reducing the volume, power consumption, and costs of the node. The OB paths may be configured and relatively fixed, and the node performs the cross-connection process on the OB paths according to the OB configuration information, thereby avoiding the problem of generation of data conflict on the optical layer due to lack of optical buffers in all-optical switching. The node completes, on the optical layer, the synchronization process and the cross-connection process on the OB paths, thereby simplifying an optical-to-electrical conversion procedure, an electrical-to-optical conversion procedure, and an electrical processing procedure, so as to reduce the power consumption, the volume, and the costs of the node.

DETAILED DESCRIPTION OF THE EMBODIMENTS

The technical solution under the present invention is elaborated below with reference to accompanying drawings and exemplary embodiments.

In order to more clearly describe a node, a data processing system, and a data processing method according to embodiments of the present invention, a communications network is taken as an example in the present invention, but the present invention is not limited to the communications network.

Figure 1:
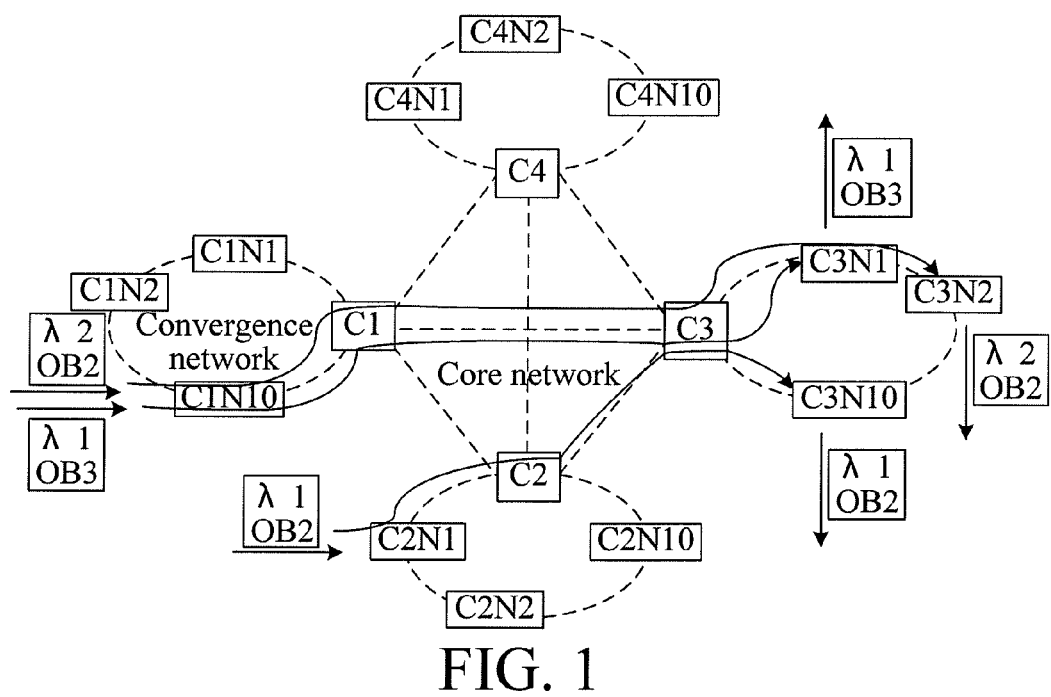
FIG. 1 is a schematic structural view of a communications network according to an embodiment of the present invention.

FIG. 1 is a schematic structural view of a communications network according to an embodiment of the present invention. Referring to FIG. 1, the communications network is formed by a core network and a convergence network, and the core network includes nodes C1, C2, C3, and C4 that serve as core nodes. C1, C2, C3, and C4 are respectively corresponding to a convergence network, and the convergence network includes a plurality of nodes, for example, the convergence network corresponding to C1 includes nodes C1N1, C1N2 . . . C1N10, and C1N1, C1N2 . . . C1N10 serve as edge nodes. In the technical solution of the present invention, service data is transferred between nodes of the communications network through OB paths, the nodes are connected through the OB paths, the OB paths are sub-wavelength paths divided on one or more wavelengths of an optical fiber, and transmission entities of the OB paths are OBs. The node processes the OBs corresponding to the OB paths bearing the service data, so as to process the OB paths.

Figures 2, 3:
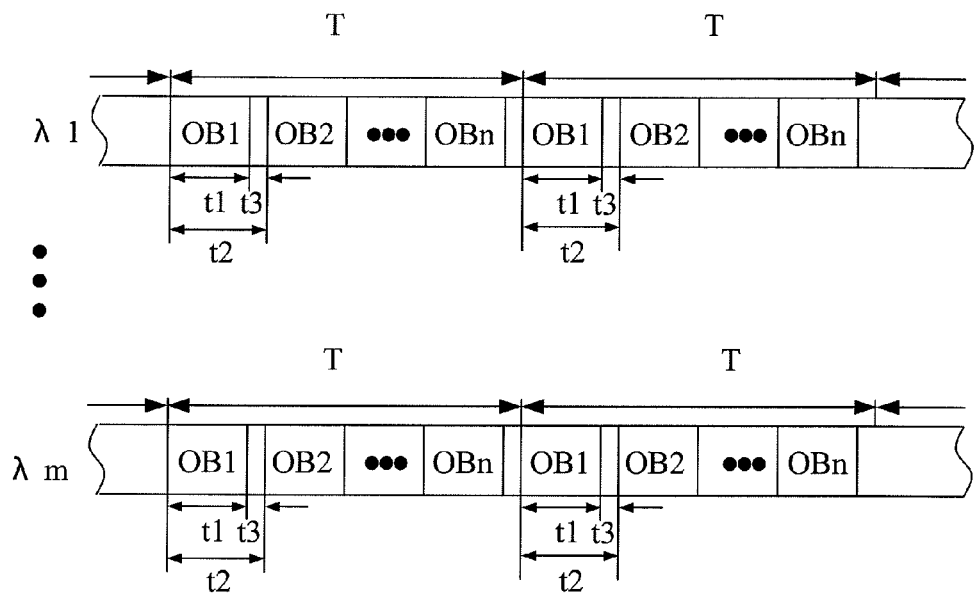
FIG. 2 is a schematic structural view of OB paths according to an embodiment of the present invention.
FIG. 3 is a schematic view of a physical format of an OB according to an embodiment of the present invention.

FIG. 2 is a schematic structural view of OB paths according to an embodiment of the present invention. Referring to FIG. 2, for example, an optical fiber includes a plurality of wavelengths λ1, λ2, ..., λm, several time-slots, which are called OB time-slots, are respectively divided on λ1, λ2, ..., λm, and t2 is the length of an OB time-slot. An effective load in the OB time-slot is the OB, the length of the OB is t1, and the data is transmitted when a laser is started within the t1 time. t3 is a protection time, which mainly refers to the time required by turn-on and turn-off of optical devices when the OBs are sent, received, and switched. A plurality of OB time-slots forms one frame, which is called an OB frame, T is a frame period, and in the drawing, OB1 to OBn form one frame. In other words, the OBs are sent periodically, and the OBs sent in the same period form an OB frame. In one wavelength, the OB frame is sent periodically by using T as a unit. The lengths of OB1, OB2, ..., OBn may be the same or different, that is, the lengths of the divided OB time-slots may be the same or different. The OBs on the same position in the different periods form one OB path, for example, OB1 path, OB2 path, ..., OBn path. Firstly, the service data is adapted to OBs. As the service data is transferred in packets, the service data is adapted to a plurality of OBs according to the packets, and the OBs are transferred at an time internal T to complete transferring of the entire service data, so that the OBs transferred at the time interval T form the OB path. For example, the service data is adapted to a plurality of OB1s, and the OB1s are transferred at the time interval T, so that the OB1s transferred at the time interval T form the OB1 path, and a plurality of OB1s bears the service data, that is, the OB1 path bears the service data. The OB path bearing the service data may be the OB path at one wavelength, for example, the OB1 path at λ1; may be the path formed by a plurality of OBs at one wavelength, for example, the OB path formed by OB1, OB2, and OB3 at λ1; may be the OB path formed by the OBs on the same corresponding position at a plurality of wavelengths, for example, the path formed by the OB1s at a part of the wavelengths or the OB1s at all the wavelengths of an optical fiber; or may be the OB path formed by the OBs on a plurality of same corresponding positions at a plurality of wavelengths, for example, the OB path formed by the OB1s and the OB2s at a part of the wavelengths or the OB1s and the OB2s at all the wavelengths of an optical fiber.

The nodes in FIG. 1 are connected through the OB paths, for example, three OB paths are as shown in FIG. 1, which are respectively an OB2 path at λ1 connecting C2N1 and C3N10, an OB3 path at λ1 connecting C1N10 and C3N1, and an OB2 path at λ2 connecting C1N10 and C3N2. For example, the service data sent from C2N1 to C3N10 is borne by the OB2 path at λ1.

FIG. 3 is a schematic view of a physical format of an OB according to an embodiment of the present invention. Referring to FIG. 3, one OB mainly includes power locking, timing, delimiting, overhead, and payload. The power locking is for a burst receiver to lock a power of the OB, the timing is for the burst receiver to lock a clock of the OB, the delimiting is for defining a limit of the OB, the OB overhead includes information of the OB path, and the payload bears the payload of the OB. It should be noted that, the power locking, the timing, and the delimiting may also be used as a part of the overhead, and the OB mainly includes the overhead and the payload. The power locking and the timing may be referred to as a preamble. The OB path may be configured, specifically, in a static or dynamic mode. The static configuration may be manual configuration, and is performed through a command line or a network management plane. The dynamic configuration may be automatic configuration, and is performed through a control plane protocol or other control protocols and algorithms, for example, through a control plane protocol of Generalized Multi-Protocol Label Switching (GMPLS) or Automatic Switch Optical Network (ASON). It should be noted that, when the configuration of the OB path is altered, the duration of the OB path is not limited, that is, in an extreme situation, one OB path may only last for the time of one frame. In this case, the bandwidth may be dynamically multiplexed through some control protocols.

In the embodiments of the present invention, by dividing a plurality of OB paths on a wavelength, service data may be transferred between nodes through the OB paths. The bandwidth of the OB path is small, thereby reducing the connection bandwidth between the nodes. A plurality of OB paths may exist on a port or ports of the node, so that the node may be connected to more nodes through the OB paths, thereby increasing the number of available connections of the node. Meanwhile, for one node, in a situation of having the same number of connections, the number of the ports of the node may be reduced, thereby reducing the volume, power consumption, and costs of the node. Different OB paths are separated and independent from one another with respect to time, so that when the configuration of one OB path is altered, other OB paths may not be affected, so that the altering of the configuration of the OB path becomes more secure, thereby facilitating the dynamic configuration of the OB path.

Figure 4:
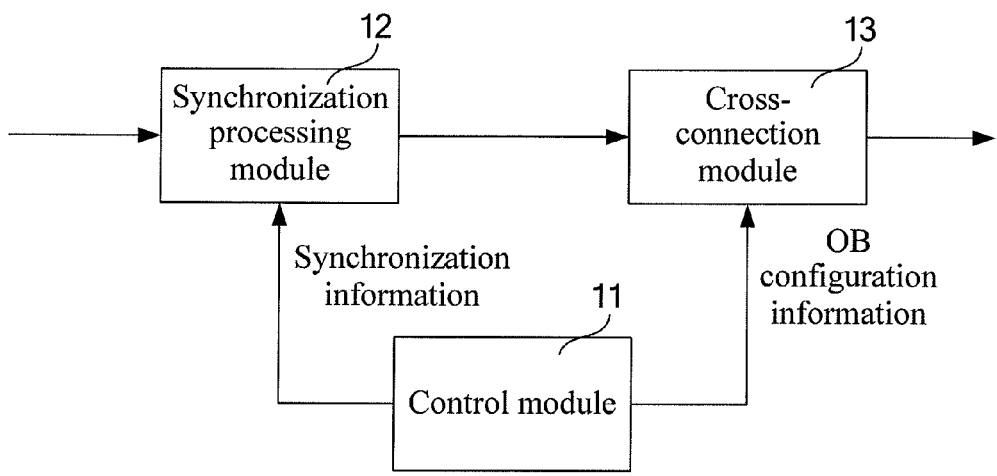
FIG. 4 is a schematic structural view of a node according to a first embodiment of the present invention.

FIG. 4 is a schematic structural view of a node according to a first embodiment of the present invention. Referring to FIG. 4, the node includes a control module 11, a synchronization processing module 12, and a cross-connection module 13. The control module 11 is adapted to generate synchronization information, and send the synchronization information to the synchronization processing module 12. The control module 11 is further adapted to generate OB configuration information, and send the OB configuration information to the cross-connection module 13. The synchronization processing module 12 performs a synchronization process on OB paths at one or more wavelengths according to the synchronization information. Then, the cross-connection module 13 performs, according to the OB configuration information, a cross-connection process on the OB paths, on which the synchronization process has been performed. In this embodiment, one or more synchronization processing modules 12 are provided, but only one is shown in FIG. 4.

A plurality of OB paths exists on a port or ports of the node in this embodiment, so that the node may be connected to more nodes through a plurality of OB paths, thereby increasing the number of available connections of the node. Meanwhile, for one node, in a situation of having the same number of connections, the number of the ports of the node may be reduced, thereby reducing the volume, power consumption, and costs of the node. In this embodiment, the OB paths may be configured and relatively fixed, and the node performs the cross-connection process on the OB paths according to the OB configuration information, thereby avoiding the problem of generation of data conflict on the optical layer due to lack of optical buffers in all optical switching. In this embodiment, the node completes, on the optical layer, the synchronization process and the cross-connection process on the OB paths, thereby simplifying an optical-to-electrical conversion procedure, an electrical-to-optical conversion procedure, and an electrical processing procedure, so as to reduce the power consumption, the volume, and the costs of the node.

Figure 5:
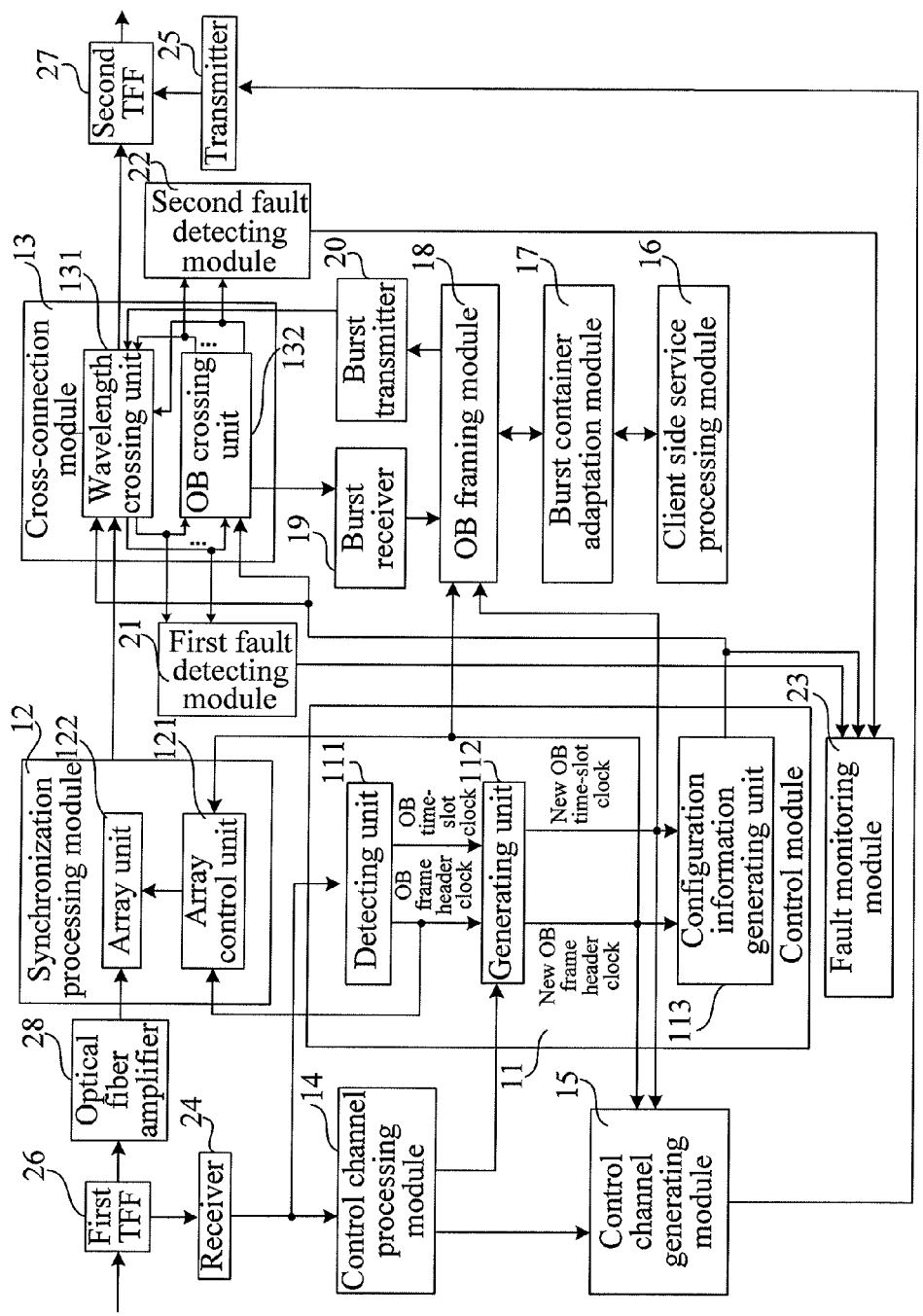
FIG. 5 is a schematic structural view of a node according to a second embodiment of the present invention.

FIG. 5 is a schematic structural view of a node according to a second embodiment of the present invention. Referring to FIG. 5, the node includes a control module 11, a synchronization processing module 12, and a cross-connection module 13. The control module 11 includes a detecting unit 111, a generating unit 112, and a configuration information generating unit 113. The detecting unit 111 is adapted to detect an OB frame header clock and an OB time-slot clock from a pre-separated signal, and send the OB frame header clock to the synchronization processing module 12, where the pre-separated signal in this embodiment is a control channel. The generating unit 112 is adapted to perform a frequency locking process and a delaying process on the OB frame header clock and the OB time-slot clock to generate a new OB frame header clock and a new OB time-slot clock, and send the new OB frame header clock to the synchronization processing module 12. The generating unit 112 is further adapted to perform a filtering process and a phase-locking process on the OB frame header clock and the OB time-slot clock. The configuration information generating unit 113 is adapted to generate the OB configuration information according to pre-set OB path configuration information, the new OB frame header clock, and the new OB time-slot clock, and send the OB configuration information to the cross-connection module 13, where in this embodiment, the OB path configuration information includes information of the OB paths connecting the nodes, that is, includes information that the nodes are connected through one or more OB paths. In addition to the OB path configuration information, the OB configuration information further includes a time sequence relation of each OB path, that is, in the cross-connection processing procedure, the cross-connection module 13 performs, according to the OB configuration information, the cross-connection process on the OBs forming the OB paths, so as to implement the cross-connection process on the OB paths. The synchronization processing module 12 includes an array control unit 121 and an array unit 122. The array control unit 121 is adapted to generate array control information according to the OB frame header clock and the new OB frame header clock. The array unit 122 is adapted to configure an optical delay array according to array control information, perform the synchronization process on the OB paths at one or more wavelengths through the optical delay array. In this embodiment, the cross-connection module 13 includes a wavelength crossing unit 131 and an OB crossing unit 132. The wavelength crossing unit 131 is adapted to perform, according to the OB configuration information, the cross-connection process on the wavelengths of the OB paths, on which the synchronization process has been performed, and the OB crossing unit 132 is adapted to perform, according to the OB configuration information, the cross-connection process on the OB paths, on which the synchronization process has been performed.

The node further includes a first Thin-Film Filter (TFF) 26, a receiver 24, a control channel processing module 14, a control channel generating module 15, a transmitter 25, and a second TFF 27. The first TFF 26 is adapted to pre-separate the control channel from the optical fiber, and send the control channel to the receiver 24. The receiver 24 is adapted to perform an optical-to-electrical conversion on the control channel, and send the converted control channel to the control channel processing module 14. The control channel processing module 14 is adapted to extract control channel information from the control channel. The control channel generating module 15 is adapted to perform an updating process on the control channel information, and generate a new control channel according to the updated control channel information by using the new OB frame header clock and the new OB time-slot clock as references. The transmitter 25 is adapted to perform an electrical-to-optical conversion on the received new control channel. The second TFF 27 is adapted to couple the new control channel, on which the electrical-to-optical conversion has been performed, to the optical fiber. Further, after extracting the control channel information, the control channel processing module 14 generates processing complete information, where the processing complete information may be used as one of the references of the delaying process when the generating unit 112 generates the new OB frame header clock and the new OB time-slot clock.

The node further includes a client side service processing module 16, a burst container adaptation module 17, and an OB framing module 18. The client side service processing module 16 is adapted to perform a detecting process and a forwarding process on the service data, and is further adapted to perform an adapting process or a convergence process on the service data. The burst container adaptation module 17 is adapted to encapsulate the processed service data in burst containers or decapsulate the service data encapsulated in the burst containers to generate the service data. Specifically, the burst container is mainly adapted to complete adapting of a service signal and a rate difference of the OBs. According to different practical applications, the burst containers may include containers of different levels. The OB framing module 18 is adapted to adapt the burst containers with the encapsulated service data to the OBs or process the received OBs to generate the burst containers with the encapsulated service data, according to the new OB frame header clock and the new OB time-slot clock. The node further includes a burst receiver 19 and a burst transmitter 20. The burst receiver 19 is adapted to perform the optical-to-electrical conversion on the OBs, on which the cross-connection process has been performed, and send the OBs to the OB framing module 18. The burst transmitter 20 is adapted to perform the electrical-to-optical conversion on the OBs adapted by the OB framing module 18, and send the OBs to the cross-connection module 13.

Further, the node includes a first fault detecting module 21, a second fault detecting module 22, and a fault monitoring module 23. The first fault detecting module 21 is adapted to detect an optical power of an input wavelength of the OB crossing unit 132. The second fault detecting module 22 is adapted to detect an optical power of an output wavelength of the OB crossing unit 132. The fault monitoring module 23 is adapted to generate OB path fault information according to the optical power of the input wavelength, the optical power of the output wavelength, and the OB configuration information, where the OB path fault information is adapted to monitor faults of the OB paths entering and passing the OB crossing unit 132, thereby monitoring the faults of the OB paths.

In addition, the node further includes an optical fiber amplifier 28, adapted to perform an optical amplification on a signal in the received optical fiber, for example, an Erbium-doped Optical Fiber Amplifier (EDFA).

The node in this embodiment needs to perform the synchronization process on the OB paths, where the synchronization process on the OB paths includes OB time-slot synchronization and OB frame synchronization. Firstly, a wavelength is designated in each optical fiber as the control channel, and the first TFF 26 separates the wavelength from the input wavelength, that is to say, the first TFF 26 pre-separates the control channel. The control channel, after the optical-to-electrical conversion performed by the receiver 24, is sent to the control channel processing module 14, and the signal of the control channel includes an OB frame identifier and an OB time-slot identifier. In the node of this embodiment, the synchronization of the OB paths at one or more wavelengths is implemented through the control channel.

Figure 6:
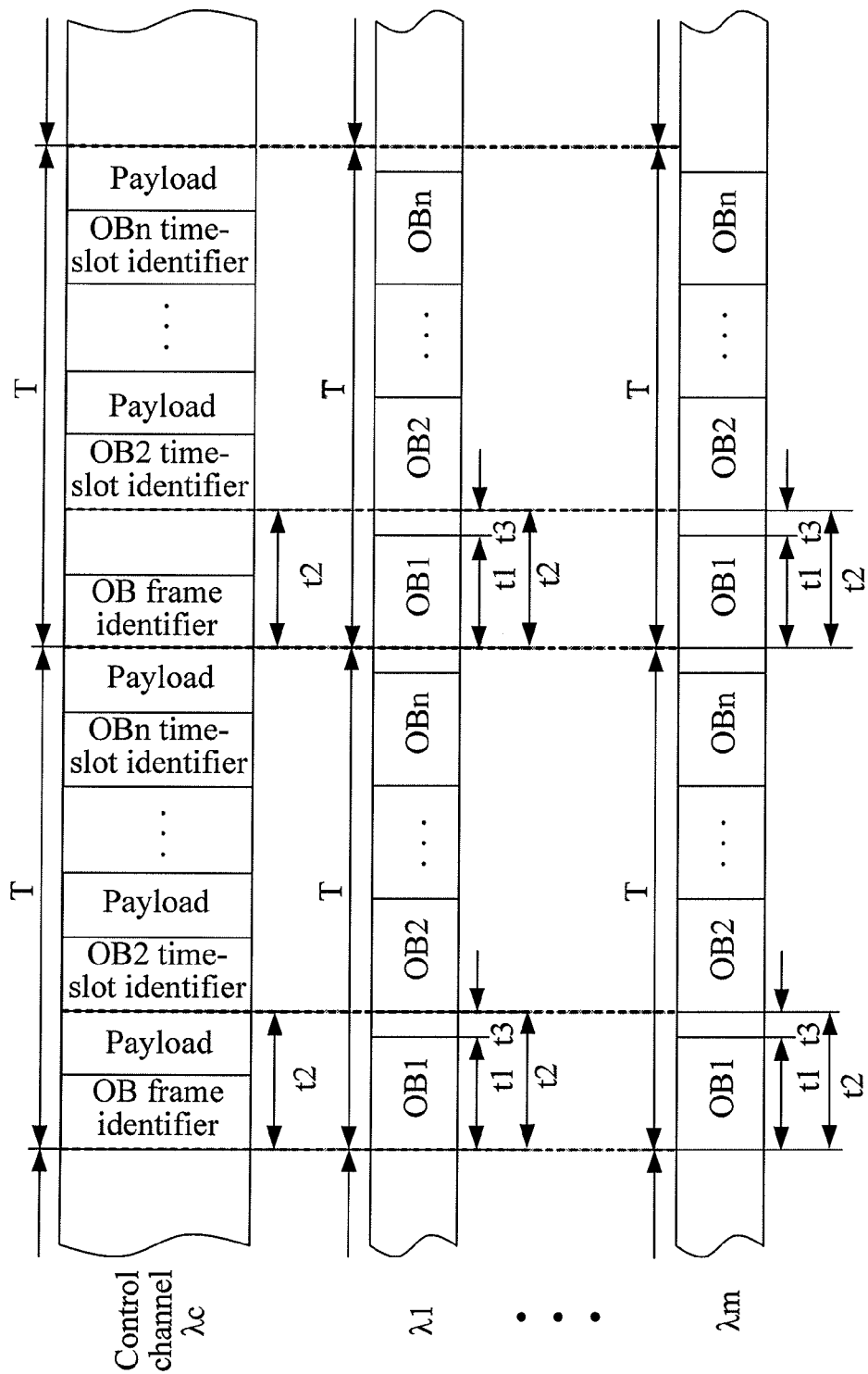
FIG. 6 is a view of a time sequence relation between a control channel and OB paths according to the second embodiment of the present invention.

FIG. 6 is a view of a time sequence relation between a control channel and OB paths according to the second embodiment of the present invention. Referring to FIG. 6, the control channel mainly includes an OB frame identifier, an OB time-slot identifier, and a payload, where the OB frame identifier represents a start position of the OB frame and also represents a start position of the OB1 time-slot, the OB time-slot identifier identifies a start position of each OB time-slot, and the payload bears clock information and other management and maintenance information. The control channel mainly has several functions, which are: transfer of clock information, transfer of synchronization information of the OB paths, and transfer of the management and maintenance information. Each node locks the clock of the control channel as a service clock, priority of the clock and other clock maintenance information are borne by the payload of the control channel, and the management and maintenance information is borne in the payload of the control channel. In each optical fiber, the synchronization is kept between the OB paths and the control channel, that is, each OB time-slot is aligned with the corresponding OB time-slot identifier of the control channel, and the OB frame is aligned with the OB frame identifier in the control channel, for example, the OB2 corresponding to the OB path at λ1 is aligned with the OB2 time-slot identifier in the control channel λc, and the OB frame at λ1 is aligned with the OB frame identifier in the control channel λc. The control channel may perform an electrical process on the node, and a delay exists, so that the OB path needs to perform an optical path delay, so as to ensure that the synchronization is still kept between the control channel and the OB paths at an egress of the node. Therefore, frame headers of the OB frames at different wavelengths, on which the synchronization process has been performed, remain in a relatively fixed phase relation, where the frame headers of the OB frames at the different wavelengths may be aligned; or, the OBs on the same position at different wavelengths, on which the synchronization process has been performed, remain in a relatively fixed phase relation, where the OBs on the same position at the different wavelengths may be aligned. In other words, the synchronization process specifically includes the following step. The frame headers of the OB frames at the different wavelengths are aligned, or the OBs on the same position at the different wavelengths are aligned.

Referring to FIG. 5, the synchronization process on the OB paths in the node is completed by the control module 11 together with the synchronization processing module 12. The detecting unit 111 detects the OB frame header clock and the OB time-slot clock from the OB frame identifier and the OB time-slot identifier of the control channel, and sends the OB frame header clock and the OB time-slot clock to the generating unit 112. The generating unit 112 performs a frequency locking process and a delaying process on the OB frame header clock and the OB time-slot clock, and generates a new OB frame header clock and a new OB time-slot clock, where in the delaying process, the processing complete information generated by the control channel processing module 14 is used as a reference, and a period of time is delayed based on the reference. In addition, the generating unit 112 monitors the processing complete information at the same time, and if the delay of the processing complete information is continuously changed and exceeds a certain threshold, the generating unit 112 adjusts the generated new OB frame header clock and the new OB time-slot clock. The array control unit 121 generates the array control information according to the OB frame header clock and the new OB frame header clock, and in this embodiment, the array control information is a time difference between the computed OB frame header clock and the new OB frame header clock. The array unit 122 configures the optical delay array according to the array control information, and performs the synchronization process on the OB paths at one or more wavelengths through the optical delay array, where in the synchronization process of this embodiment, the optical path delay is performed on the OB paths. During the synchronization process, the control channel generating module 15 performs the updating process according to the control channel information generated by the control channel processing module 14, and generates the new control channel according to the control channel information after the updating process by using the new OB frame header clock and the new OB time-slot clock as the references. The new control channel, after the electrical-to-optical conversion performed by the transmitter 25, is sent, to the second TFF 27, and is coupled to the optical fiber by the second TFF 27. Meanwhile, the optical path delaying process is performed on the OB paths, so that the synchronization is kept between the OB paths, on which the cross-connection process has been performed, and the new control channel coupled to the optical fiber.

After the synchronization process is performed on the OB paths, the cross-connection process needs to be performed on the OB paths, on which the synchronization process has been performed. Referring to FIG. 5, the wavelength crossing unit 131 is adapted to perform, according to the OB configuration information, the cross-connection process on the wavelengths of the OB paths, on which the synchronization process has been performed, and the OB crossing unit 132 is adapted to perform, according to the OB configuration information, the cross-connection process on the OB paths, on which the synchronization process has been performed. When the OB path is a locally dropped OB path, the OB crossing unit 132 sends the OBs corresponding to the OB path to the burst receiver 19, and the burst receiver 19 performs the optical-to-electrical conversion on the received OBs, and sends the OBs to the OB framing module 18. The OB framing module 18 processes the received OBs to generate the burst containers with the encapsulated service data. The burst container adaptation module 17 decapsulates the service data encapsulated in the burst containers to generate the service data. The client side service processing module 16 performs the detecting process and the forwarding process on the service data, and further performs the adapting process on the service data. Therefore, a local dropping procedure of the service data is complete. When the service data is added to the node, the client side service processing module 16 performs the detecting process and the forwarding process on the service data, and further performs the adapting process or the convergence process on the service data. The burst container adaptation module 17 encapsulates the processed service data to the burst containers. The OB framing module 18 adapts the burst containers with the encapsulated service data to the OBs according to the new OB frame header clock and the new OB time-slot clock. The burst transmitter 20 performs the electrical-to-optical conversion on the adapted OBs and sends the OBs to the cross-connection module 13. The burst transmitter 20 of this embodiment performs the electrical-to-optical conversion on the adapted OBs, and sends the OBs to the wavelength crossing unit 131. Therefore, an adding procedure of the service data is complete.

According to different types of burst receivers and burst transmitters adopted by the nodes in the communications network, structures of the cross-connection modules 13 in the nodes and the cross-connection processing procedures may be different. For example, the node in this embodiment may be the edge node C2N1 in the convergence network corresponding to the core node C2 in FIG. 1, and all the edge nodes in FIG. 1 adopt the burst transmitter 19 having a fixed wavelength and the burst receiver 20 having an adjustable wavelength. Here, each edge node in FIG. 1 may only send the service data with the fixed wavelength, that is, the service data added to each edge node is sent with a fixed wavelength, which is not shown in FIG. 1, and a plurality of OB paths bearing the service data among the nodes as shown in FIG. 1 is only adapted to describe various situations of transferring the service data through the OB paths, instead of describing the situation of the OB paths bearing the service data among the nodes in this embodiment.

Figure 7:
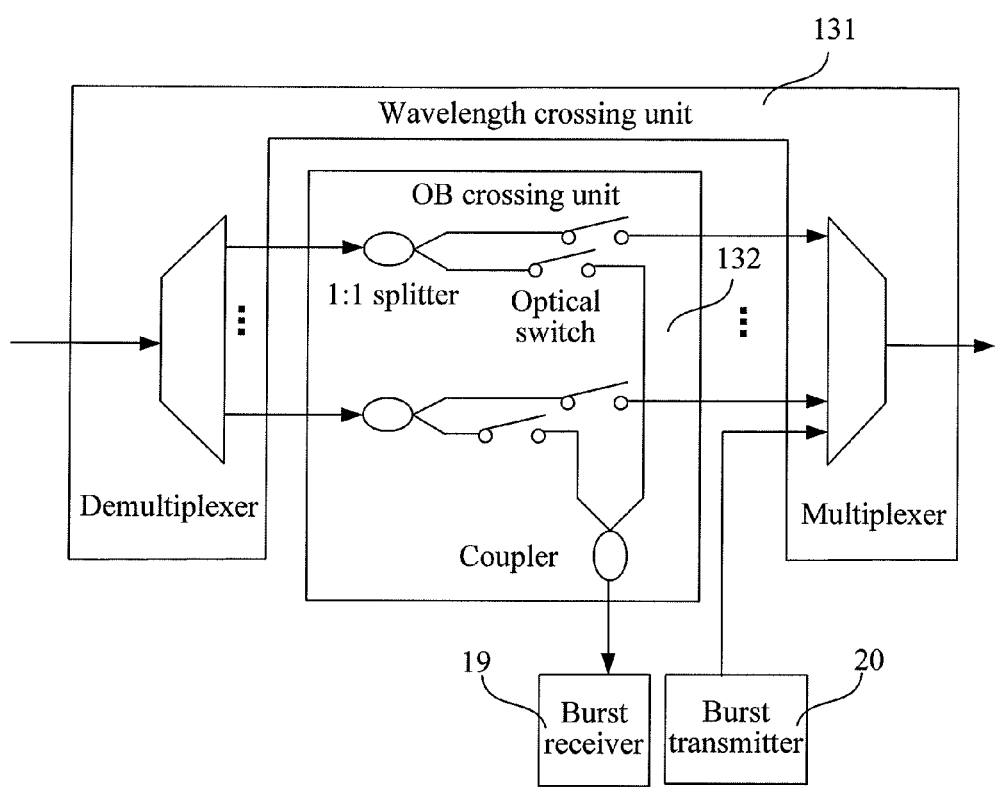
FIG. 7 is a first schematic structural view of a cross-connection module in a node according to an embodiment of the present invention.

FIG. 7 is a first schematic structural view of a cross-connection module in a node according to an embodiment of the present invention. Referring to FIG. 7, the cross-connection module includes a wavelength crossing unit 131 and an OB crossing unit 132, where the wavelength crossing unit 131 includes a demultiplexer and a multiplexer, and the OB crossing unit 132 includes a plurality of splitters, a plurality of optical switches, and a coupler. A burst receiver 19 connected to the cross-connection module is a burst receiver having an adjustable wavelength, so that the burst receiver 19 may receive the OBs at different wavelengths, that is, the OBs which are sent from different nodes and need to be dropped at the node; in other words, the burst receiver 19 may connected with the OB paths that need to be locally dropped, and thus the cross-connection module needs to perform the cross-connection process on the connected OB paths at a plurality of wavelengths. Firstly, the demultiplexer of the wavelength crossing unit 131 performs a demultiplexing process on the received wavelengths. Then, the OBs corresponding to the OB path on each wavelength are processed by controlling the splitters and the optical switches of the OB crossing unit 132, the OBs corresponding to the OB path connected with the node, that is, the OBs corresponding to the locally dropped OB path, are extracted, and the extracted OBs at the different wavelengths are coupled by the coupler and then sent to the burst receiver 19, that is, the OB crossing unit 132 processes the OBs corresponding to the OB path to implement the dropping procedure of the OB path, and sends the wavelengths of the OB paths not required to be locally dropped to the multiplexer. The burst transmitter 20 in this embodiment is a burst transmitter having a fixed wavelength, so that the burst transmitter 20 needs to send the OBs corresponding to the locally added OB path to the multiplexer with the fixed wavelength, so as to add the OB path. The OB paths not required to be locally dropped may directly pass through in the cross-connection module, that is, pass through the optical layer of the node, without performing the optical-to-electrical conversion, the electrical-to-optical conversion, and the complicated electrical processing procedure. The cross-connection module of FIG. 7 is applicable to a situation that the service data that is sent from other nodes and needs to be dropped at the node is borne on one OB path at one wavelength or a plurality of OB paths at one wavelength. The cross-connection module of the node extracts the OBs corresponding to one OB path at one wavelength or the OBs corresponding to a plurality of OB paths at one wavelength, so as to complete the dropping procedure of the service data. When the service data that is sent from other nodes and needs to be dropped at the node is borne on the OB path formed by the OBs on the same position at a plurality of wavelengths, a schematic structural view of the cross-connection module may be as shown in FIG. 8.

Figure 8:
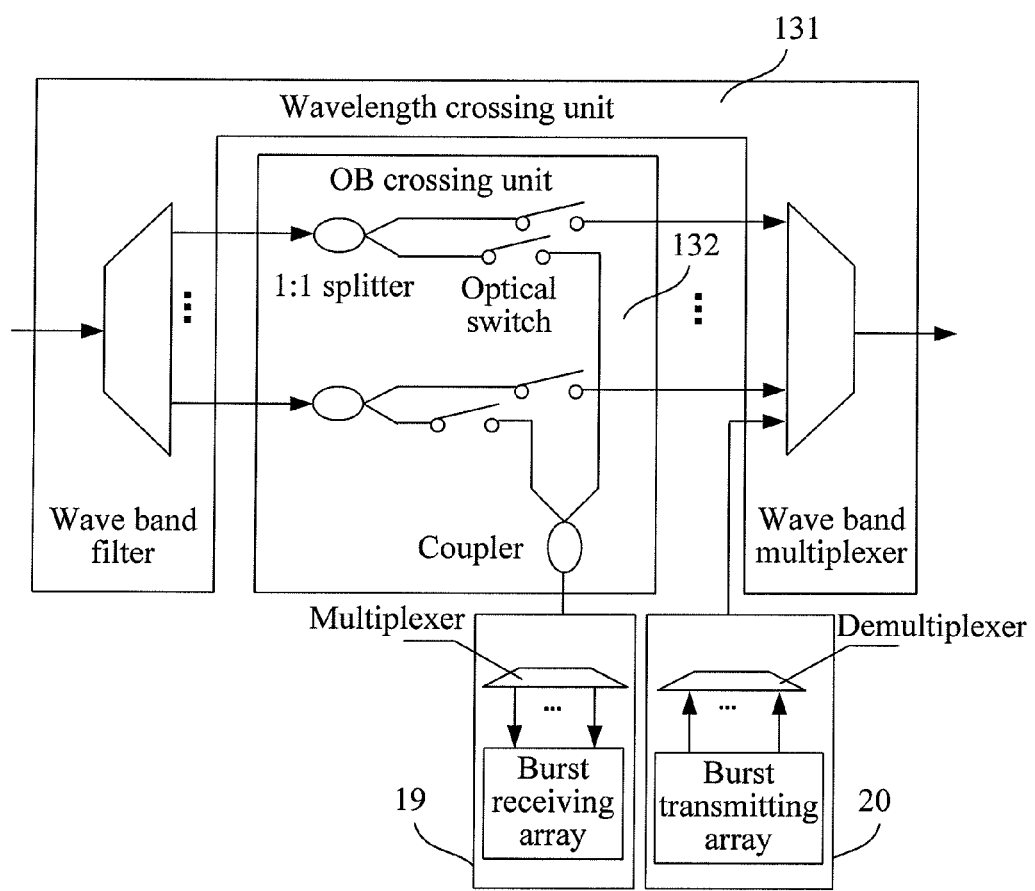
FIG. 8 is a second schematic structural view of a cross-connection module in a node according to an embodiment of the present invention.

FIG. 8 is a second schematic structural view of a cross-connection module in a node according to an embodiment of the present invention. Referring to FIG. 8, the cross-connection module includes a wavelength crossing unit 131 and an OB crossing unit 132. The wavelength crossing unit 131 includes a wave band filter and a wave band multiplexer, and the OB crossing unit 132 includes a plurality of splitters, a plurality of optical switches, and a coupler. The OB paths corresponding to the service data locally dropped at the node are borne in a plurality of wavelengths, so that the wave band filter of the wavelength crossing unit 131 needs to filter the wave band in the optical fiber, and filters a plurality of wavelengths corresponding to the OB paths. Then, a plurality of wavelengths bearing the OB paths is processed by controlling the splitters and the optical switches of the OB crossing unit 132, the OBs at a plurality of wavelengths and required to be received by the node are extracted, and the extracted OBs at a plurality of wavelengths are coupled and sent to the burst receiver 19. The burst receiver 19 in this embodiment includes a demultiplexer and a burst receiving array. The demultiplexer performs a demultiplexing process on a plurality of wavelengths of the OB paths, and sends the wavelengths to the burst receiving array. The burst receiving array receives the OBs at the different wavelengths, so as to complete the dropping procedure of the service data borne on the OB paths at a plurality of wavelengths. The OB path that does not need to be dropped at the node and the OB path that needs to be added to the node are both connected with the wave band multiplexer. The service data added to the node may be borne on the OB path formed by the OBs on the same position at a plurality of wavelengths. When the service data that is sent from other nodes and needs to be dropped at the node is borne on a plurality of OB paths formed by the OBs on a plurality of same corresponding positions at a plurality of wavelengths, the structure and the function of the cross-connection module are the same as the situation that the service data is borne on the OB path formed by the OBs on the same position at a plurality of wavelengths, and the dropping procedure of the service data is also similar to the situation that the service data is borne on the OB path formed by the OBs on the same position at a plurality of wavelengths, except that the burst receiving array receives the OBs on a plurality of same corresponding positions at the different wavelengths at the same time, so as to complete the dropping procedure of the service data. The cross-connection module in FIG. 8 has a special situation, where when service data required to be dropped at the node is borne on the OB path formed by the OBs on the same position at all the wavelengths on one optical fiber or is borne on a plurality of OB paths formed by the OBs on a plurality of same corresponding positions at all the wavelengths on one optical fiber, the wavelength crossing unit 131 may be simplified, and does not need the wave band filter and the wave band multiplexer. However, a coupler is required to couple the locally added OB path to the optical fiber. The OB crossing unit 132 includes the splitters and the optical switches. The OB crossing unit 132 processes the OB path borne on all the wavelengths, extracts the OBs in the OB path, and sends the extracted OBs to the OB receiver 19.

Figure 9:
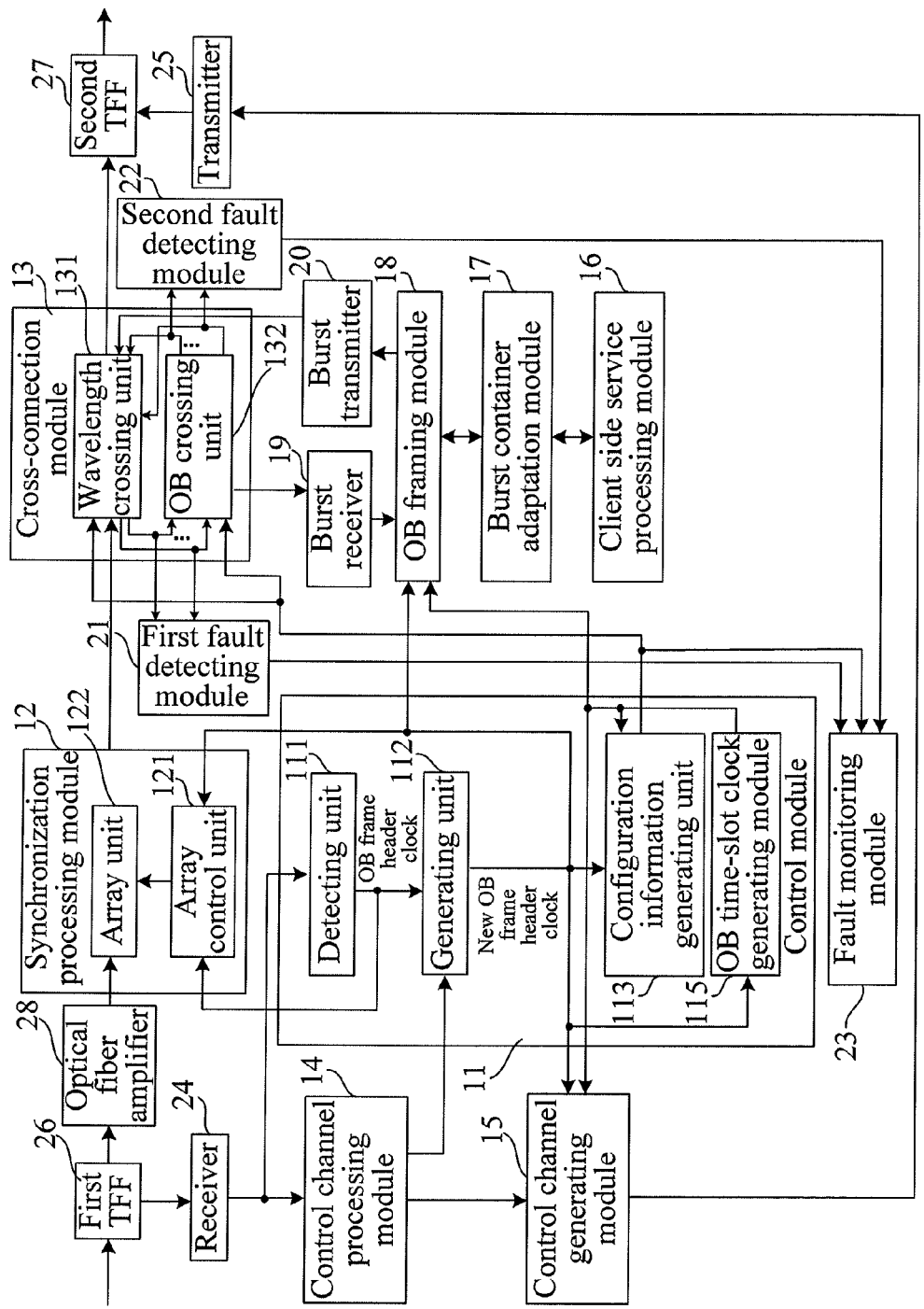
FIG. 9 is a schematic structural view of a node according to a third embodiment of the present invention.

FIG. 9 is a schematic structural view of a node according to a third embodiment of the present invention. Referring to FIG. 9, a difference between this embodiment and the second embodiment lies in the control module 11. The control module 11 of this embodiment includes a detecting unit 111, a generating unit 112, a configuration information generating unit 113, and an OB time-slot clock generating module 115. The detecting unit 111 is adapted to detect an OB frame header clock from a pre-separated signal, and send the OB frame header clock to the synchronization processing module 12, where the pre-separated signal of this embodiment is a control channel. The generating unit 112 is adapted to perform a frequency locking process and a delaying process on the OB frame header clock to generate a new OB frame header clock, and send the new OB frame header clock to the synchronization processing module 12 and the OB time-slot clock generating module 115. The generating unit 112 is further adapted to perform a filtering process and a phase-locking process on the OB frame header clock. The OB time-slot clock generating module 115 is adapted to generate a new OB time-slot clock by using a start position of the new OB frame header clock as a reference. The configuration information generating unit 113 is adapted to generate OB configuration information according to preset OB path configuration information, the new OB frame header clock, and the new OB time-slot clock, and send the OB configuration information to the cross-connection module 13. The difference between this embodiment and the second embodiment is that the new OB time-slot clock is generated by the OB time-slot clock generating module 115. The functions of the remaining modules are the same as those of the second embodiment, and the details thereof may not be described herein again. This embodiment is usually adapted to the situation that an interval length (that is, a protection time) between the OBs is great.

In this embodiment, the interval length between the OBs is great, so that in the synchronization processing procedure performed by the node on the OB paths, the synchronization process performed on the OB paths may only include OB frame synchronization, and the OB time-slot clock is generated by the node according to the generated new OB frame header clock (the OB time-slot clock resulting from the clock error between the different nodes is absorbed by the interval between the OBs). Specifically, the synchronization is kept between the OB paths and the control channel, that is, the OB frames of the OB paths are aligned with the OB frame identifier in the control channel.

Figure 10:
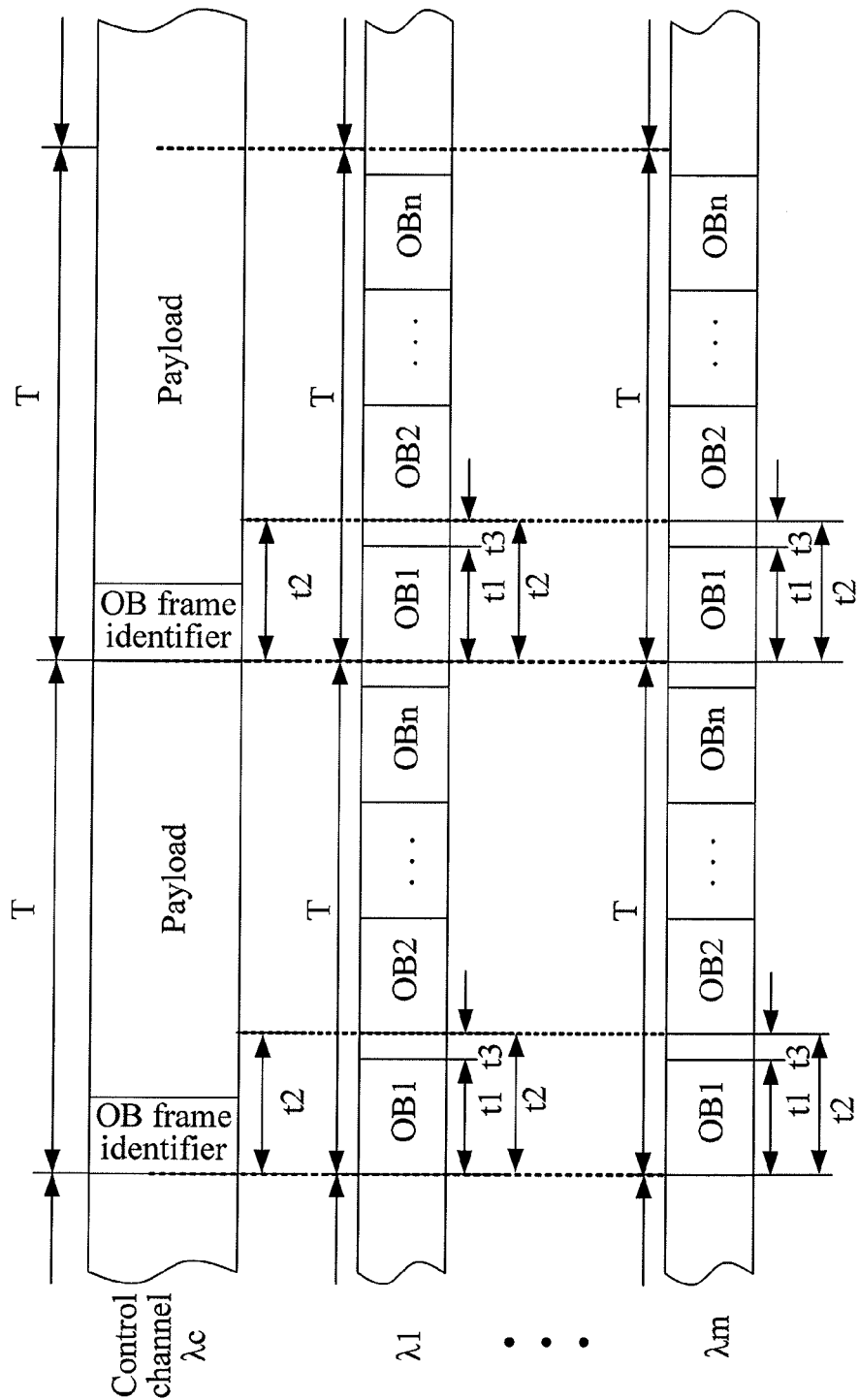
FIG. 10 is a view of a time sequence relation between a control channel and OB paths according to the third embodiment of the present invention.

FIG. 10 is a view of a time sequence relation between a control channel and OB paths according to the third embodiment of the present invention. Referring to FIG. 10, the control channel mainly includes an OB frame identifier and a payload, where the OB frame identifier represents a start position of the OB frame. During the synchronization procedure between the OB paths and the control channel, the OB frames of the OB paths need to be aligned with the OB frame identifier in the control channel, for example, the OB frames at λ1 are aligned with the OB frame identifier in the control channel λc.

In addition, all the edge nodes in FIG. 1 may adopt the burst transmitter having the adjustable wavelength and the burst receiver having the fixed wavelength. Here, each edge node receives the OB paths at one fixed wavelength, and this situation is not shown in FIG. 1. A plurality of OB paths bearing the service data among the nodes as shown in FIG. 1 is only adapted to describe a plurality of situations of transferring the service data through the OB paths, instead of describing the situation of the OB paths bearing the service data among the nodes in this embodiment. In this case, the cross-connection module 13 of the node may only include a wavelength crossing unit 131.

Figure 11:
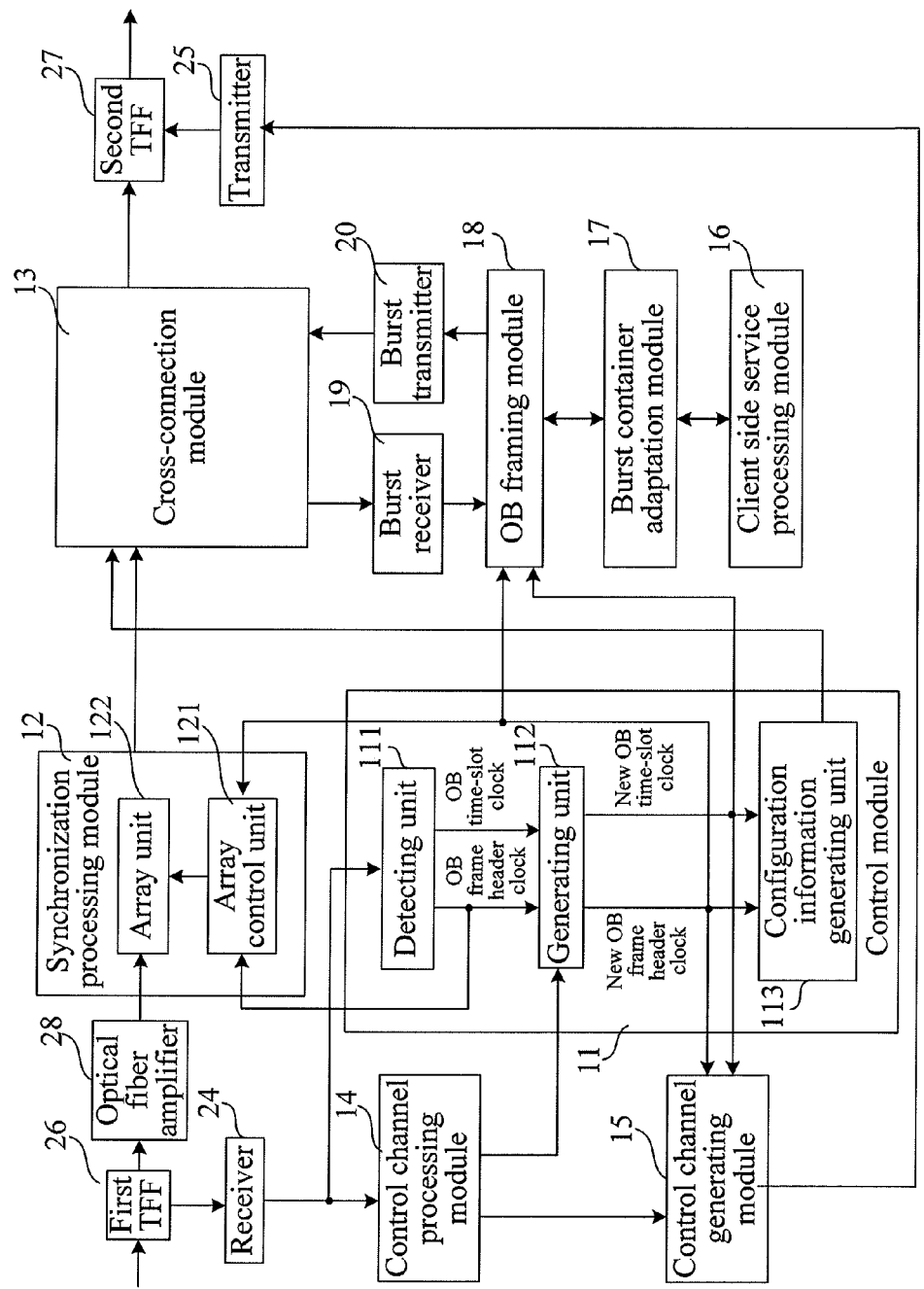
FIG. 11 is a schematic structural view of a node according to a fourth embodiment of the present invention.

FIG. 11 is a schematic structural view of a node according to a fourth embodiment of the present invention. Referring to FIG. 11, a difference between this embodiment and the second embodiment is only that the cross-connection module of this embodiment does not include the OB crossing unit, so that the node of this embodiment does not include the first fault detecting module and the second fault detecting module, and the channel fault detecting function may be completed by the burst receiver. Thus, the node may further include a fault monitoring module (not shown in the Figure). The remaining modules and functions are the same as those of the second embodiment, and the details thereof may not be described herein again. The cross-connection module 13 only includes a wavelength crossing unit 131, and a specific structure of the cross-connection module 13 is as shown in FIG. 12.

Figure 12:
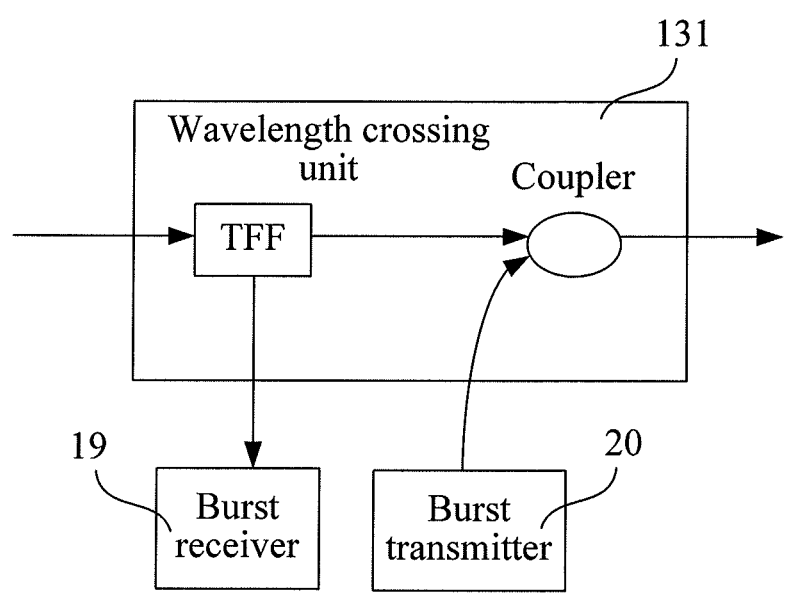
FIG. 12 is a third schematic structural view of a cross-connection module in a node according to an embodiment of the present invention.

FIG. 12 is a third schematic structural view of a cross-connection module in a node according to an embodiment of the present invention. Referring to FIG. 12, the cross-connection module includes a wavelength crossing unit 131, where the wavelength crossing unit 131 includes a TFF and a coupler. For the edge node, the burst receiver 19 connected to the cross-connection module is the burst receiver having the fixed wavelength, so that the OB paths at the fixed wavelength are the OB paths required to be connected by the edge node, that is, the OB paths dropped at the edge node. Therefore, in the cross-connection processing procedure of the wavelength crossing unit 131, the wavelengths required to be received by the burst receiver 19 are extracted from a plurality of wavelengths of the optical fiber, and this procedure is implemented by the TFF of the wavelength crossing unit 131. The TFF filters the wavelengths required to be received by the burst receiver 19 from a plurality of wavelengths of the optical fiber, and sends the wavelengths to the burst receiver 19, so as to complete the local dropping procedure of the OB paths. Meanwhile, the TFF sends the remaining wavelengths of the OB paths not required to be locally dropped to the coupler, and the burst transmitter 20 is the burst transmitter having the adjustable wavelength, so that the OBs corresponding to the OB paths may be directly coupled to the optical fiber by the coupler with the required wavelength. In the cross-connection processing procedure, the cross-connection process is only performed on the wavelengths of the OB paths, so as to implement the cross-connection process on the OB path. The cross-connection module in FIG. 12 is applicable to the situation that the OB path required to be locally dropped is one OB path at one wavelength or a plurality of OB paths at one wavelength.

Figure 13:
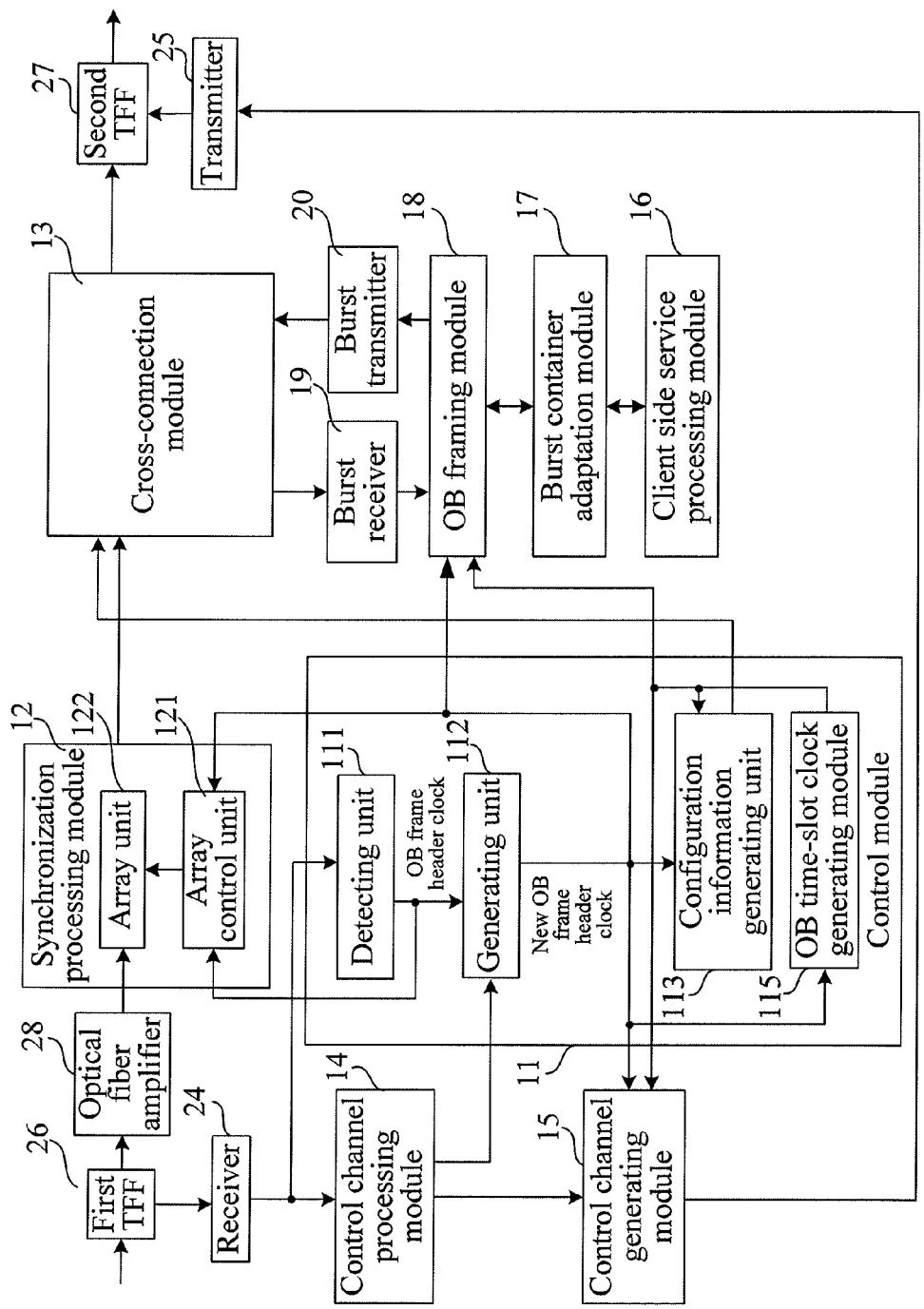
FIG. 13 is a schematic structural view of a node according to a fifth embodiment of the present invention.

FIG. 13 is a schematic structural view of a node according to a fifth embodiment of the present invention. Referring to FIG. 13, a difference between this embodiment and the fourth embodiment lies in the control module 11. The control module 11 of this embodiment includes a detecting unit 111, a generating unit 112, a configuration information generating unit 113, and an OB time-slot clock generating module 115. The detecting unit 111 is adapted to detect an OB frame header clock from a pre-separated signal, and send the OB frame header clock to the synchronization processing module 12, where the pre-separated signal of this embodiment is a control channel. The generating unit 112 is adapted to perform a frequency locking process and a delaying process on the OB frame header clock to generate a new OB frame header clock, and send the new OB frame header clock to the synchronization processing module 12 and the OB time-slot clock generating module 115. The generating unit 112 is further adapted to perform a filtering process and a phase-locking process on the OB frame header clock. The OB time-slot clock generating module 115 is adapted to generate a new OB time-slot clock by using a start position of the new OB frame header clock as a reference. The configuration information generating unit 113 is adapted to generate OB configuration information according to preset OB path configuration information, the new OB frame header clock, and the new OB time-slot clock, and send the OB configuration information to the cross-connection module 13. The difference between this embodiment and the fourth embodiment lies in that, the new OB time-slot clock is generated by the OB time-slot clock generating module 115. The functions of the remaining modules are the same as those of the fourth embodiment, and the details thereof may not be described herein again. This embodiment is usually adapted to the situation that an interval length (that is, a protection time) between the OBs is great.

In this embodiment, for the specific procedure that the node performs the synchronization process on the OB path, reference can be made to the description in the third embodiment.

The nodes in the second embodiment to the fifth embodiment may be used as the edge node and the core node, so as to complete the synchronization process and the cross-connection process on the OB paths. Especially, when the node is used as the edge node, in the cross-connection processing procedure, by dropping the OB path, the node receives the service data; by adapting the service data to the OBs and adding the OBs, the OB paths are added, so that the node sends the service data; and the OB paths not dropped at the node directly pass the node, so that the service data is forwarded.

In the technical solutions from the second embodiment to the fifth embodiment, for the node, especially, the node used as the edge node, a plurality of OB paths exists on a port or ports of the node, so that the node may be connected to more nodes through a plurality of OB paths, thereby increasing the number of available connections of the node. Meanwhile, for one node, in a situation of having the same number of connections, the number of the ports of the node may be reduced, thereby reducing the volume, power consumption, and costs of the node. The OB paths in this embodiment may be configured and relatively fixed, and the node performs the cross-connection process on the OB paths according to the OB configuration information, thereby avoiding the problem of generation of data conflict on the optical layer due to lack of optical buffers in all optical switching.

Figure 14:
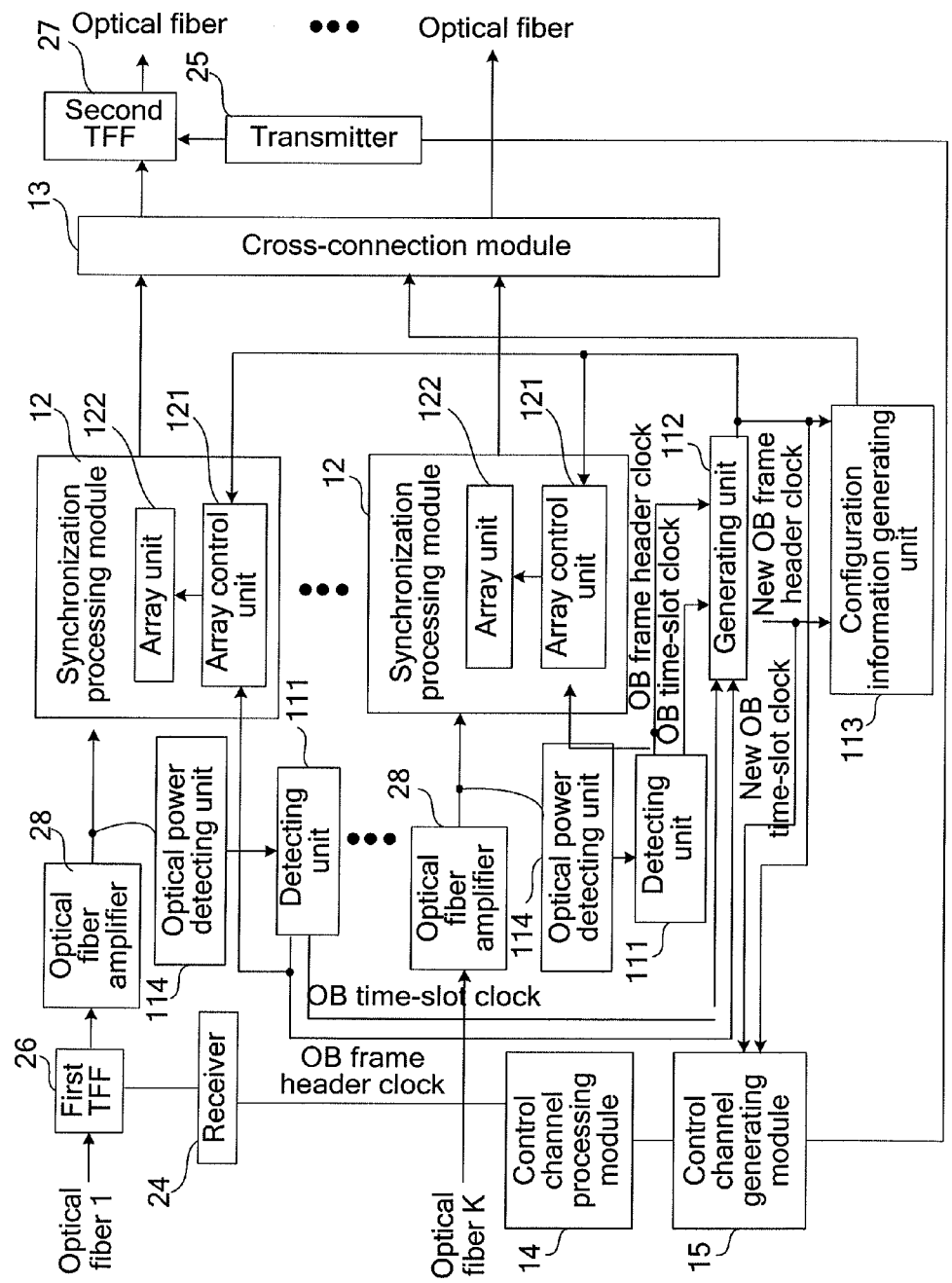
FIG. 14 is a schematic structural view of a node according to a sixth embodiment of the present invention.

FIG. 14 is a schematic structural view of a node according to a sixth embodiment of the present invention. Referring to FIG. 14, the node includes a control module 11, a plurality of synchronization processing modules 12, and a cross-connection module 13. The control module 11 includes a plurality of optical power detecting units 114, a plurality of detecting units 111, a generating unit 112, and a configuration information generating unit 113. In this embodiment, an optical power detecting unit 114, a detecting unit 111, and a synchronization processing module 12 are configured for each optical fiber. The optical power detecting unit 114 is adapted to perform an optical-to-electrical conversion on a received optical power signal, and output an optical power envelope signal to the detecting unit 111. The detecting unit 111 is adapted to detect an OB frame header clock and an OB time-slot clock from the pre-separated signal, and send the OB frame header clock to the synchronization processing module 12, where the pre-separated signal of this embodiment is an optical power envelope signal. The generating unit 112 is adapted to perform a frequency locking process and a delaying process on the OB frame header clock and the OB time-slot clock to generate a new OB frame header clock and a new OB time-slot clock, and send the new OB frame header clock to the synchronization processing module 12. The generating unit 112 is further adapted to perform a filtering process and a phase-locking process on the OB frame header clock and the OB time-slot clock. The configuration information generating unit 113 is adapted to generate OB configuration information according to preset OB path configuration information, the new OB frame header clock, and the new OB time-slot clock, and send the OB configuration information to the cross-connection module 13. Each synchronization processing module 12 includes an array control unit 121 and an array unit 122. The array control unit 121 is adapted to generate array control information according to the OB frame header clock and the new OB frame header clock, and the array unit 122 is adapted to configure an optical delay array according to the array control information, perform a synchronization process on the OB paths at a plurality of wavelengths through the optical delay array, and send the OB paths, on which the synchronization process has been performed, to the cross-connection module 13. The cross-connection module 13 is adapted to perform, according to the configuration information, a cross-connection process on the OB paths, on which the synchronization process has been performed, sent by a plurality of synchronization processing modules.

The node further includes a first TFF 26, a receiver 24, a control channel processing module 14, a control channel generating module 15, a transmitter 25, and a second TFF 27. The first TFF 26 pre-separates the control channel from the optical fiber, and sends the control channel to the receiver 24. The receiver 24 is adapted to perform an optical-to-electrical conversion on the received control channel, and send the converted control channel to the control channel processing module 14. The control channel processing module 14 is adapted to extract control channel information from the control channel. The control channel generating module 15 is adapted to perform an updating process on the control channel information, and generate a new control channel according to the updated control channel information by using the new OB frame header clock and the new OB time-slot clock as references. The transmitter 25 is adapted to perform an electrical-to-optical conversion on the received new control channel. The second TFF 27 is adapted to couple the new control channel, on which the electrical-to-optical conversion has been performed, to the optical fiber. A plurality of control paths may be provided in this embodiment, for example, one control channel may be separated from each optical fiber, and the control paths may be separated from a part of the optical fibers according to different practical applications.

The node may further include a plurality of optical fiber amplifiers 28, adapted to perform an optical amplification on a signal in the received optical fiber, for example, an EDFA.

The node in this embodiment needs to perform the synchronization process on the OB paths. The synchronization process performed by the node on the OB paths is performed based on the information of the OBs. Each optical power detecting unit 114 separates 10% optical power signals from the connected optical fiber to be detected, and outputs the optical power envelope signal. The detecting unit 111 detects the OB frame header clock and the OB time-slot clock of each optical fiber from the optical power envelope signal. The generating unit 112 performs a synthetic process according to the OB frame header clock and the OB time-slot clock corresponding to each optical fiber, and selects one optimal value as the new OB frame header clock and the new OB time-slot clock. The array control unit 121 corresponding to each optical fiber generates the array control information according to the OB frame header clock and the new OB frame header clock, where the array control information of this embodiment is a time difference between the computed OB frame header clock and the new OB frame header clock. The array unit 122 configures the optical delay array according to the array control information, and performs the optical path delay on the OB paths through the optical delay array, so as to complete the synchronization processing procedure on the OB path at a plurality of wavelengths in a plurality of optical fibers.

Figure 15:
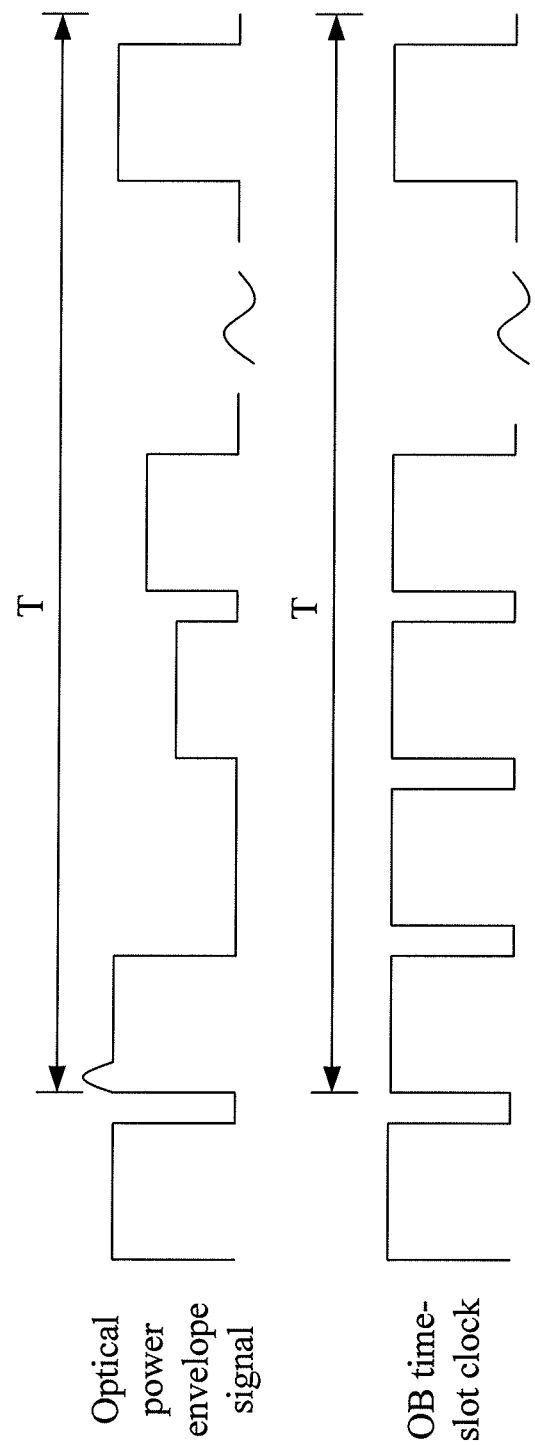
FIG. 15 is a schematic view of an optical power envelope signal and an OB time-slot clock in a node according to a fourth embodiment of the present invention.

In the following, the procedure that the detecting unit detects the OB frame header clock and the OB time-slot clock during the synchronization process is further described in detail through specific instances. FIG. 15 is a schematic view of an optical power envelope signal and an OB time-slot clock in a node according to a fourth embodiment of the present invention. Referring to FIG. 15, the optical power detecting unit 114 outputs the optical power envelope signal in one optical fiber, it is assumed that the OB paths at the different wavelengths in one optical fiber are synchronized, the optical power envelope signal includes several pulses, and the pulses are corresponding to the different OB time-slots. The OB is not always configured on the OB time-slot of each wavelength in the optical fiber, so that pulse amplitudes in the optical power envelope signal are different, or even are absent. The detecting unit 111 needs to firstly process, for example, shape and filter, the optical power envelope signal, so as to obtain the regular OB time-slot clock, as shown in FIG. 15. Then, the detecting unit 111 detects the OB frame header clock from the optical power envelope signal. Specifically, for example, it is preset that a power locking area of the OB1 corresponding to the first OB time-slot (OB1 time-slot) adopts an all "1" code, and power locking areas of the OBs corresponding to the other OB time-slots adopt "1" and "0" mixed codes, for example, codes similar to "101010" in which "1" and "0" are alternated. Thus, as long as the power locking area is long enough, that is, the code is long enough, a peak is detected from a position corresponding to a header of the OB1 time-slot in the optical power envelope signal. The detecting unit 111 detects the power value of the OB time-slot in the optical power envelope signal according to the preset code of the power locking area of the OB, for example, samples the power value in one OB time-slot for several times. If the power value of the OB time-slot satisfies the characteristic that the code of the power locking region of the OB is the all "1" code, that is, a power peak is detected from the start position of a certain OB time-slot, and in this case, the code is all "1", it represents that the OB time-slot is the OB1 time-slot, that is, the start position of the OB frame, the pulse is extracted, and the "OB frame header clock" is acquired, so that the detecting unit 111 completes the procedure of detecting the OB frame header clock and the OB time-slot clock from each optical fiber.

The synchronization process on the OB paths at a plurality of wavelengths in this embodiment may also adopt the synchronization processing method of the second embodiment, where the method for implementing the synchronization of the OB paths by using the control channel in the second embodiment is mature. However, in this embodiment, a plurality of optical fibers is connected to the node, and if the synchronization processing method of the second embodiment is adopted, the control channel needs to be separated from each optical fiber, and the control channel needs to be processed, so that the number of the control paths is redundant. Therefore, in this embodiment, the synchronization of the OB paths is implemented by adopting the information of the OBs, so as to reduce the process on the control channel, so that the transmission of the service data and the control management are separated, and the costs are further reduced. In addition, the synchronization processing procedure performed by the node on the OB paths of the second embodiment also adopts the method of the fourth embodiment, and the optical power detecting unit needs to be added to the control module.

After the synchronization process is performed on the OB paths, the cross-connection process needs to be performed on the OB paths, on which the synchronization process has been performed. For example, in the communications network, the node of this embodiment may be the core node C2 in FIG. 1. According to different types of burst receivers and burst transmitters adopted by the edge nodes in the communications network, structures of the cross-connection modules 13 in the nodes and the cross-connection processing procedures in this embodiment may be different. When all the edge nodes in the communications network adopt the burst receiver 19 having the fixed wavelength and the burst transmitter 20 having the adjustable wavelength, the cross-connection module 13 in C2 may only include the wavelength crossing unit 131, and the cross-connection function is implemented by the wavelength crossing unit 131.

Figure 16:
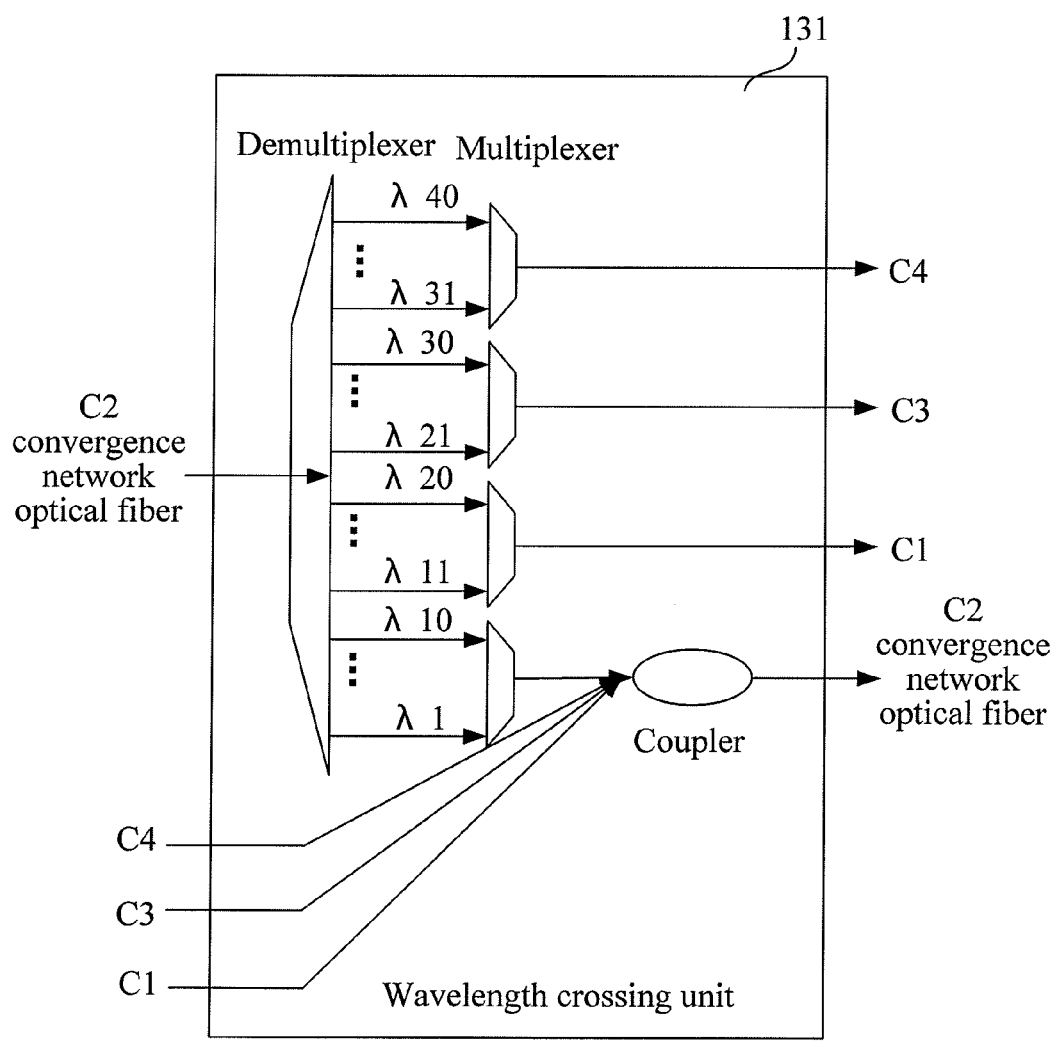
FIG. 16 is a fourth schematic structural view of a cross-connection module in a node according to an embodiment of the present invention.

FIG. 16 is a fourth schematic structural view of a cross-connection module in a node according to an embodiment of the present invention. Referring to FIG. 16, the cross-connection module only includes a wavelength crossing unit 131, and the wavelength crossing unit 131 includes a demultiplexer, a multiplexer, and a coupler. The edge node adopts the burst receiver having the fixed wavelength, that is, the edge node corresponding to C2 only receives the fixed wavelength, so that the demultiplexer in the wavelength crossing unit 131 of C2 performs a demultiplexing process on the wavelengths in the optical fibers connected to the edge node, the multiplexer respectively performs a multiplexing process on the wavelengths received by other core nodes and the wavelengths received by the edge node corresponding to C2, and the wavelengths received by the edge node corresponding to C2 are coupled to the C2 convergence network optical fiber by the coupler. The service data from other core nodes C1, C3, and C4 is the service data required to be received by the edge node corresponding to C2, so that it is only necessary to couple the wavelengths of the OB paths bearing the service data to the C2 convergence network optical fiber by the coupler. The cross-connection module in FIG. 16 performs the cross-connection process on the wavelengths of the OB paths, so as to implement the cross-connection process on the OB paths.

Figure 17:
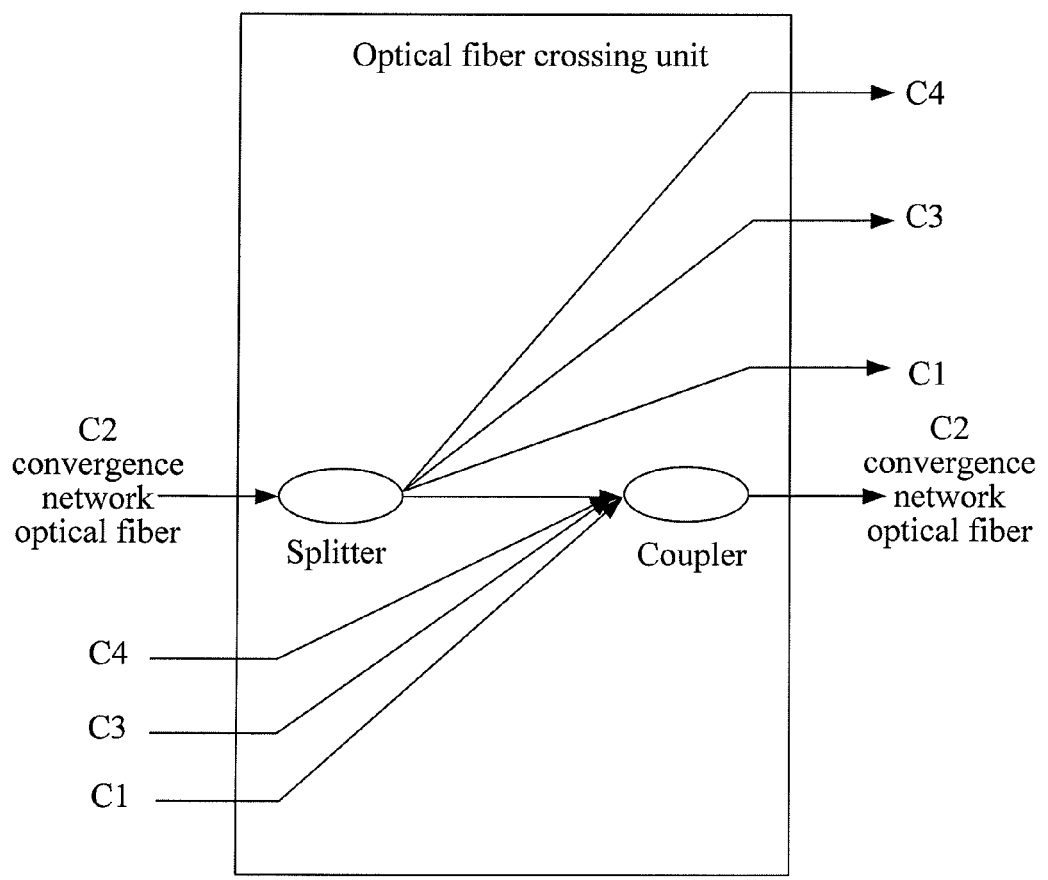
FIG. 17 is a fifth schematic structural view of a cross-connection module in a node according to an embodiment of the present invention.

Further, for example, when all the edge nodes in the communications network adopt the burst receiver 19 having the adjustable wavelength and the burst transmitter 20 having the fixed wavelength, the cross-connection module 13 in C2 may only include the optical fiber crossing unit, and the cross-connection function is implemented by the optical fiber crossing unit. FIG. 17 is a fifth schematic structural view of a cross-connection module in a node according to an embodiment of the present invention. Referring to FIG. 17, the cross-connection module only includes an optical fiber crossing unit, where the optical fiber crossing unit includes a splitter and a coupler. The burst receiver in the edge network is the burst receiver having the adjustable wavelength, that is, the edge node corresponding to C2 may receive any wavelength, so that the optical fiber crossing unit only needs to perform a splitting process on the C2 convergence network optical fiber, and the optical fiber after the splitting process is coupled to the C2 convergence network by the coupler and is sent to other core nodes. The optical fibers of other core nodes accessed to the optical fiber crossing unit 131 are directly coupled to the C2 convergence network by the coupler.

Figure 18:
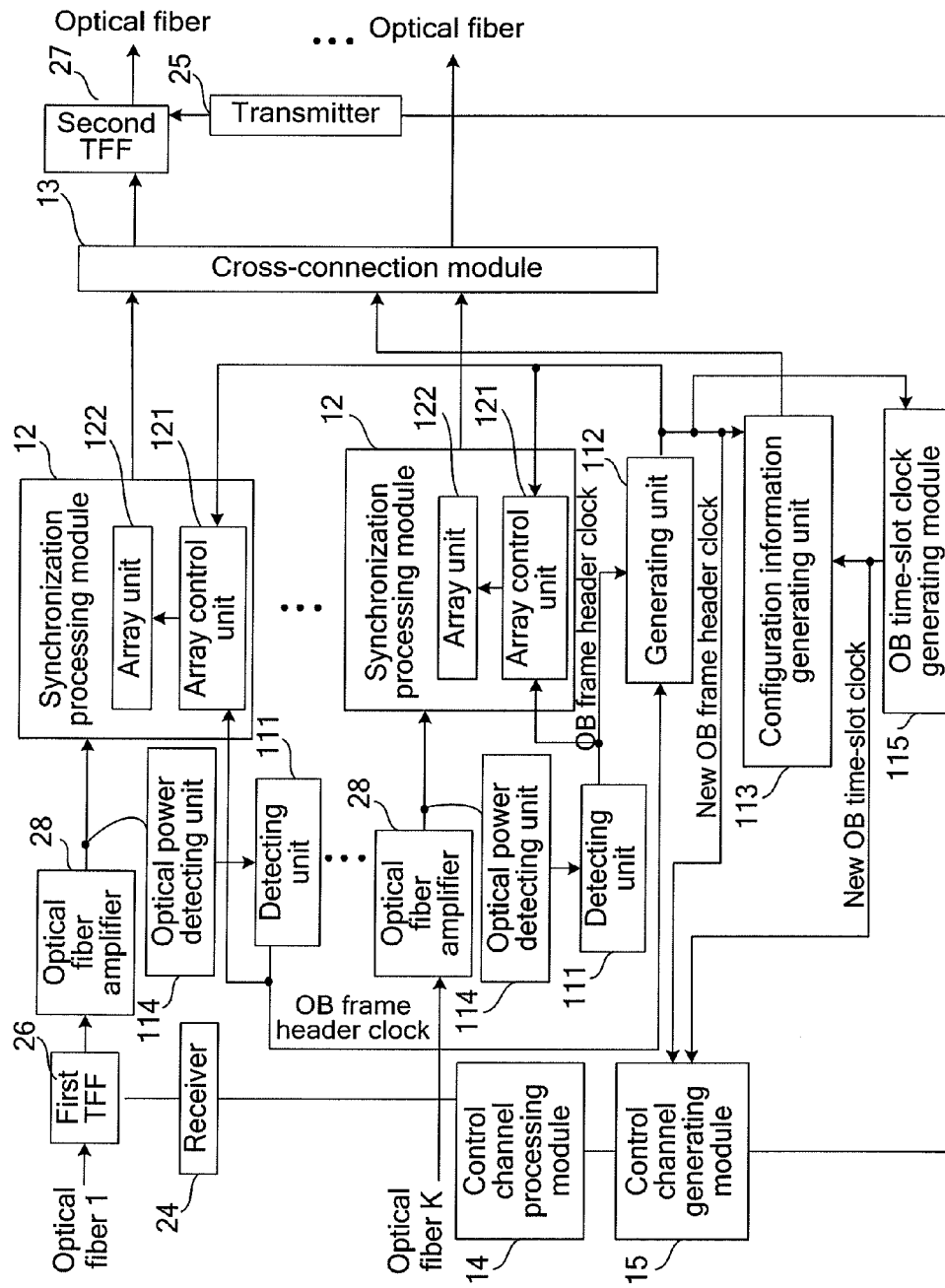
FIG. 18 is a schematic structural view of a node according to a seventh embodiment of the present invention.

FIG. 18 is a schematic structural view of a node according to a seventh embodiment of the present invention. Referring to FIG. 18, a difference between this embodiment and the sixth embodiment lies in the control module 11. The control module 11 of this embodiment includes a plurality of optical power detecting units 114, a plurality of detecting units 111, a generating unit 112, a configuration information generating unit 113, and an OB time-slot clock generating module 115. The optical power detecting unit 114 is adapted to perform an optical-to-electrical conversion on a received optical power signal, and output an optical power envelope signal to the detecting unit 111. The detecting unit 111 is adapted to detect an OB frame header clock from the pre-separated signal, and send the OB frame header clock to the synchronization processing module 12 and the OB time-slot clock generating module 115, where the pre-separated signal of this embodiment is an optical power envelope signal. The generating unit 112 is adapted to perform a frequency locking process and a delaying process on the OB frame header clock to generate a new OB frame header clock, and send the new OB frame header clock to the synchronization processing module 12. The generating unit 112 is further adapted to perform a filtering process and a phase-locking process on the OB frame header clock. The OB time-slot clock generating module 115 is adapted to generate a new OB time-slot clock by using a start position of the new OB frame header clock as a reference. The configuration information generating unit 113 is adapted to generate OB configuration information according to preset OB path configuration information, the new OB frame header clock, and the new OB time-slot clock, and send the OB configuration information to the cross-connection module 13. The difference between this embodiment and the sixth embodiment is that the new OB time-slot clock is generated by the OB time-slot clock generating module 115. The functions of the remaining modules are the same as those of the sixth embodiment, and the details thereof may not be described herein again. This embodiment is usually adapted to the situation that an interval length (that is, a protection time) between the OBs is great.

The nodes of the sixth embodiment and the seventh embodiment may serve as the core node and the edge node, so as to complete the synchronization process and the cross-connection process on the OB paths. Especially, when the node is used as the core node, in the cross-connection processing procedure, the node completes the cross-connection process on the wavelengths or the optical fibers of the OB paths, so as to implement the cross-connection process on the OB paths. The OB paths may directly pass the node without performing the optical-to-electrical conversion, the electrical-to-optical conversion, and the electrical processing procedure, so that the OB paths directly pass through the optical layer of the node.

The OB paths of the sixth embodiment and the seventh embodiment may be configured and relatively fixed, and the node, especially used as the core node, performs the cross-connection process on the OB paths according to the OB configuration information, thereby avoiding the problem of generation of data conflict on the optical layer due to lack of optical buffers in all optical switching. The node completes the synchronization process and the cross-connection process on the OB paths on the optical layer, thereby reducing the optical-to-electrical conversion, the electrical-to-optical conversion, and the electrical processing procedure, so as to reduce the power consumption, the volume, and the costs of the node. On the basis of the seven embodiments, the OB path may be protected by adopting a channel protection manner, so as to enhance reliability of the network. In accordance with the different protection manners, the implementation manners are also different, and specifically, reference may be made to the method for protecting the path in the currently mature wavelength division network and Synchronous Digital Hierarchy (SDH) network. For example, for implementing the protection of the OB paths, on the source node, that is, the node to which the service data is added, the service data of the client side is processed by the client side service processing module, encapsulated by the burst container adaptation module, and sent to the OB framing module. The service data is adapted by the OB framing module to the OBs, and the OBs are replicated to two paths and then sent by the OB transmitter. The two paths of the same OB respectively form different OB paths, and the two OB paths form the protection relation. In a common situation, the two OB paths pass different physical links, for example, optical fiber paths. After the destination node, that is, the node at which the service data is dropped, receives the two OB paths, the OB framing module may select and process an OB path, and if the destination node detects that the currently selected OB path has a fault, the destination node switches to the other OB path, so as to complete a protection switching procedure of the OB paths, thereby protecting the OB paths. The different OB paths are separated and independent from one another with respect to time, so that the protection switching procedure of the OB paths does not affect other OB paths, and thus the reliability of the network is enhanced.

In an embodiment, the present invention further provides a data processing system. As an embodiment, the data processing system includes at least two nodes, where the nodes transfer service data by using OB paths at one or more wavelengths.

In the data processing system of this embodiment, the nodes are connected through the OB paths, so as to transfer the service data. A plurality of OB paths exists on a port or ports of the node, so that the node may be connected to more nodes through the OB paths, and the number of available connections of the node is increased. Meanwhile, for one node, in a situation of having the same number of connections, the number of the ports of the node may be reduced, thereby reducing the volume, power consumption, and costs of the node. The OB paths for transferring the service data may be configured and relatively fixed, and the node may process the OB paths, thereby avoiding the problem of generation of data conflict on the optical layer due to lack of optical buffers in all optical switching.

As another embodiment, the data processing system includes four nodes. The nodes transfer the service data by using the OB paths at one or more wavelengths, where the four nodes are adapted to perform a synchronization process and a cross-connection process on the OB paths at one or more wavelengths bearing the service data. For example, as shown in FIG. 1, the four nodes may be a core node C2 in a core network, an edge node C2N1 in a convergence network corresponding to the core node C2, a core node C3 in the core network, and an edge node C3N10 in the convergence network corresponding to the core node C3.

The edge nodes C2N1 and C3N10 may adopt the node of FIG. 5 or FIG. 9, specific structures of the edge nodes C2N1 and C3N10 and functions of each structure are the same as those of the second embodiment or the third embodiment of the node, and the details thereof may not be described herein again.

The core nodes C2 and C3 may adopt the node of FIG. 14 or FIG. 18, specific structures of the core nodes C2 and C3 and functions of each structure are the same as those of the sixth embodiment or the seventh embodiment of the node, and the details thereof may not be described herein again.

When all the edge nodes in the communications network adopt a burst receiver having an adjustable wavelength and a burst transmitter having a fixed wavelength, a cross-connection module in the edge nodes C2N1 and C3N10 in the data processing system may adopt the cross-connection module in FIG. 7. As shown in FIG. 7, the cross-connection module includes a wavelength crossing unit 131 and an OB crossing unit 132, where the wavelength crossing unit 131 includes a demultiplexer and a multiplexer, and the OB crossing unit 132 includes a plurality of splitters, a plurality of optical switches, and a coupler. The core nodes C2 and C3 in the data processing system may adopt the cross-connection module in FIG. 17. As shown in FIG. 17, the cross-connection module only includes an optical fiber crossing unit, where the optical fiber crossing unit includes a splitter and a coupler.

In the following, the procedure that the data processing system performs the synchronization process and the cross-connection process on the OB paths is specifically described through an instance.

For example, the service data needs to be sent from C2N1 in the C2 convergence network to C3N10 in the C3 convergence network, and the service data needs to pass C2N1, C2, C3, and C3N10 in sequence, and is borne by one OB path at one wavelength, for example, an OB2 path at λ1 in this embodiment. In the procedure of transferring the service data, the data processing system needs to perform the synchronization process and the cross-connection process on the OB path bearing the service data, so as to implement adding, passing-through, and dropping procedures of the OBs corresponding to the OB path, thereby completing transferring of the service data.

As shown in FIG. 5 and FIG. 7, the edge node C2N1 completes the adding procedure of the service data required to be sent to C3N10 through a client side service processing module 16, a burst container adaptation module 17, an OB framing module 18, and a burst transmitter 20. The client side service processing module 16 receives the service data required to be sent, and performs a detecting process and a forwarding process on the service; and further performs an adapting process or a convergence process, and sends the processed service data to the burst container adaptation module 17. The burst container adaptation module 17 encapsulates the service data in burst containers. The OB framing module 18 adapts the burst containers with the encapsulated service data to the OB according to the new OB frame header clock and the new OB time-slot clock generated when C2N1 performs the synchronization process, and in this embodiment, the OB is the OB2 at λ1. At the same time, the OB framing module 18 forms the OB frame with the OB2 and the OBs sent to other edge nodes, and the wavelength of the OB frame is λ1. The burst transmitter 20 sends the OB frame of the OB2 to the wavelength crossing unit 131, so as to complete the adding procedure of the service data on N1. The multiplexer of the wavelength crossing unit 131 performs a multiplexing process on the wavelength of the OB2 and other wavelengths, and sends the wavelengths to the core node C2. As shown in FIGS. 14 and 17, the core node C2 connects the OB paths from the convergence network optical fiber and the OB paths from other core node optical fibers, and performs the synchronization processing procedure on the OB paths in all the optical fibers, where the synchronization processing procedure is completed by a plurality of synchronization processing modules 12 and a control module 11, and the specific synchronization processing method is the same as that of the sixth embodiment of the node, the details of which may not be described herein again. Next, the splitter of the optical fiber crossing unit performs a splitting process on the C2 convergence network optical fiber, so as to directly split the C2 convergence network optical fiber to C3, that is, to directly split the optical fiber of the OB2 path bearing the service data to C3. C3 performs the synchronization processing procedure on the OB paths in the accessed optical fibers, where the synchronization processing procedure is completed by a plurality of synchronization processing modules 12 and the control module 11, and the specific synchronization processing method is the same as the sixth embodiment of the node, the details of which may not be described herein again. Then, a coupler in the optical fiber crossing unit of C3 directly couples the optical fiber accessed to C3 to the C3 convergence network optical fiber, that is, couples the optical fiber of the OB2 path bearing the service data to the optical fiber accessed to N10 in the C3 convergence network. As shown in FIG. 5 and FIG. 7, the synchronization processing module 12 and the control module 11 of the edge node C3N10 perform the synchronization process on the OB paths at a plurality of wavelengths in the C3 optical fiber, where the specific synchronization processing method is the same as that of the second embodiment of the node, and the details thereof may not be described herein again. Afterwards, the demultiplexer of the wavelength crossing unit 131 of C3N10 performs a demultiplexing process on a plurality of wavelengths in the C3 optical fiber, on which the synchronization process has been performed, the OBs on each wavelength are processed by controlling the splitters and the optical switches of the OB crossing unit 132, and the OBs required to be received by the node are extracted, that is, the locally dropped OBs, including the OB2 at λ1 bearing the service data. The OB2 and other OBs that need to be locally dropped are coupled by the coupler, and sent to the burst receiver 19. The burst receiver 19 performs the optical-to-electrical conversion on the locally dropped OBs, and sends the OBs to the OB framing module 18. The OB framing module 18 processes the received OBs to generate the burst containers with the encapsulated service data. The burst container adaptation module 17 decapsulates the burst containers with the encapsulated service data to generate the service data, where the service data includes the service data borne by the OB2 path. Finally, the client side service processing module 16 performs the detecting process and the forwarding process on the service data, and further performs the adapting process, thereby completing the dropping procedure of the service data on the OB2 path at the C3N10, that is, the service data is sent from C2N1 in the C2 convergence network to C3N10 in the C3 convergence network through the OB2 path at λ1.

In this embodiment, the service data may be borne on a plurality of OB paths at one wavelength, and the synchronization and cross-connection processing procedures are similar to the synchronization and cross-connection processing procedures when the service data is borne on one OB path at one wavelength, except that the service data added to the edge node C2N1 and the service data dropped at the edge node C2N10 are borne on a plurality of OB paths at one wavelengths, where the details of the specific synchronization and cross-connection processing procedures may not be described herein again.

In this embodiment, when the service data is borne on the OB path formed by the OBs on the same corresponding position at a plurality of wavelengths or a plurality of OB paths formed by the OBs on a plurality of same corresponding positions at a plurality of wavelengths, the edge nodes C2N1 and C3N10 may adopt the node in FIG. 5, and the cross-connection module may adopt the cross-connection module in FIG. 8 to perform the cross-connection process on the OB path bearing the service data, so as to complete the adding procedure of the service data on C2N1 and the dropping procedure of the service data at C3N10, where the specific processing procedure is the same as that of the second embodiment of the node, and the details thereof may not be described herein again. When the service data is borne on the OB path formed by the OBs on the same position at all the wavelengths on one optical fiber or a plurality of OB paths formed by the OBs on a plurality of same corresponding positions at all the wavelengths on one optical fiber, the wavelength crossing unit 131 in FIG. 8 may be simplified, and does not need the wave band filter and the wave band multiplexer. However, a coupler is required to couple the locally added OB path to the optical fiber.

In the data processing system of this embodiment, the nodes are connected through the OB paths, that is, transfer the service data through the OB paths. A plurality of OB paths exists on a port or ports of the node, so that the node may be connected to more nodes through the OB paths, and the number of available connections of the node is increased. Meanwhile, for one node, in a situation of having the same number of connections, the number of the ports of the node may be reduced, thereby reducing the volume, power consumption, and costs of the node. The OB paths may be configured and relatively fixed, and the node, including the edge node and the core node, performs the cross-connection process on the OB paths according to the configuration information, thereby avoiding the problem of generation of data conflict on the optical layer due to lack of optical buffers in all optical switching. The node, especially, the core node, completes the synchronization process and the cross-connection process on the OB paths on the optical layer, so that the optical-to-electrical conversion, the electrical-to-optical conversion, and the electrical processing procedure are reduced, the power consumption, the volume, and the costs of the node are reduced, and the capital costs and the operational costs of the communications network are lowered, which is appropriate to construct the network with a large capacity, so as to satisfy the quickly increased data service transferring demands.

As another embodiment, the data processing system includes four nodes. The nodes transfer the service data by using the OB paths at one or more wavelengths, where the four nodes are adapted to perform the synchronization process and the cross-connection process on the OB paths at one or more wavelengths bearing the service data. For example, as shown in FIG. 1, the four nodes may be the core node C2 in the core network, the edge node C2N1 in the convergence network corresponding to the core node C2, the core node C3 in the core network, and the edge node C3N10 in the convergence network corresponding to the core node C3.

The edge nodes C2N1 and C3N10 may adopt the node in FIG. 11. As shown in FIG. 11, specific structures of the edge nodes C2N1 and C3N10 and functions of each structure are the same as those of the second embodiment or the fourth embodiment of the node, and the details thereof may not be described herein again.

The core nodes C2 and C3 may adopt the node in FIG. 14. As shown in FIG. 14, specific structures of the core nodes C2 and C3 and functions of each structure are the same as those of the sixth embodiment of the node, and the details thereof may not be described herein again.

When all the edge nodes in the communications network adopt the burst receiver having the adjustable wavelength and the burst transmitter having the fixed wavelength, the cross-connection module in the edge nodes C2N1 and C3N10 in the data processing system may adopt the cross-connection module in FIG. 12. As shown in FIG. 12, the cross-connection module includes a wavelength crossing unit 131, where the wavelength crossing unit 131 includes a TFF and a coupler. The core nodes C2 and C3 in the data processing system may adopt the cross-connection module in FIG. 16. As shown in FIG. 16, the cross-connection module only includes a wavelength crossing unit 131, and the wavelength crossing unit 131 includes a demultiplexer, a multiplexer, and a coupler.

In the following, the procedure that the data processing system performs the synchronization process and the cross-connection process on the OB paths is specifically described through an instance.

For example, the service data needs to be sent from C2N1 in the C2 convergence network to C3N10 in the C3 convergence network, and the service data needs to pass C2N1, C2, C3, and C3N10 in sequence, and is borne by one OB path at one wavelength, for example, an OB2 path at $\lambda 1$ in this embodiment. In the procedure of transferring the service data, the data processing system needs to perform the synchronization process and the cross-connection process on the OB path bearing the service data, so as to implement adding, passing-through, and dropping procedures of the OBs corresponding to the OB path, thereby completing transferring of the service data.

As shown in FIG. 11 and FIG. 12, the edge node C2N1 completes the adding procedure of the service data required to be sent to C3N10 through a client side service processing module 16, a burst container adaptation module 17, an OB framing module 18, and a burst transmitter 20. The client side service processing module 16 receives the service data required to be sent, and performs a detecting process and a forwarding process on the service; and further performs an adapting process or a convergence process, and sends the processed service data to the burst container adaptation module 17. The burst container adaptation module 17 encapsulates the service data in burst containers. The OB framing module 18 adapts the burst containers with the encapsulated service data to the OB according to the new OB frame header clock and the new OB time-slot clock generated when C2N1 performs the synchronization process, and in this embodiment, the OB is the OB2 at $\lambda 1$. At the same time, the OB framing module 18 forms the OB frame with the OB2 and the OBs sent to the OB paths of other edge nodes, and the wavelength of the OB frame is $\lambda 1$. The burst transmitter 20 sends the OB frame of the OB2 to the wavelength crossing unit 131, so as to complete the adding procedure of the service data on C2N1. The coupler of the wavelength crossing unit 131 directly couples the wavelength of the OB2 path to the optical fiber, and sends the wavelength to the core node C2. As shown in FIGS. 14 and 16, the core node C2 receives the OB paths from the convergence network optical fiber and the OB paths from other core node optical fibers, and performs the synchronization processing procedure on the OB paths in all the optical fibers, where the synchronization processing procedure is completed by a plurality of synchronization processing modules 12 and a control module 11, and the specific synchronization processing method is the same as that of the sixth embodiment of the node, the details of which may not be described herein again. Next, the demultiplexer of the optical fiber crossing unit 131 performs a demultiplexing process on the wavelengths from the C2 convergence network optical fiber, and the multiplexer performs a multiplexing process on the wavelength $\lambda 1$ of the OB2 path and other wavelengths required to be sent to C3, and sends the wavelengths to C3. C3 performs the synchronization process on the OB paths at the wavelengths in the accessed optical fibers, where the specific synchronization processing method is the same as the sixth embodiment of the node, and the details thereof may not be described herein again. Afterwards, the wavelength crossing unit 131 of C3 directly couples the optical fiber accessed to C2 to the C3 convergence network optical fiber, that is, couples the optical fiber of the OB2 path bearing the service data to the optical fiber accessed to C3N10 in the C3 convergence network. As shown in FIG. 11 and FIG. 12, the synchronization processing module 12 and the control module 11 of the edge node C3N10 perform the synchronization process on the OB paths at a plurality of wavelengths in the C3 optical fiber, where the specific synchronization processing method is the same as that of the sixth embodiment of the node, and the details thereof may not be described herein again. Next, the TFF of the wavelength crossing unit 131 of C3N10 filters λ1 from a plurality of wavelengths in the optical fiber, and sends λ1, that is, the OB paths at λ1, to the burst receiver 19, where the OB paths include the OB2 path bearing the service data. The burst receiver 19 performs the optical-to-electrical conversion on the OBs corresponding to the locally dropped OB path, and sends the OBs to the OB framing module 18. The OB framing module 18 processes the OB path to generate the burst containers with the encapsulated service data. The burst container adaptation module 17 decapsulates the burst containers with the encapsulated service data to generate the service data, where the service data includes the service data borne by the OB2 path. Finally, the client side service processing module 16 performs the detecting process and the forwarding process on the service data, and further performs the adapting process on the service data, thereby completing the dropping procedure of the service data on the OB2 path at the N10, that is, the service data is sent from C2N1 in the C2 convergence network to C3N10 in the C3 convergence network through the OB2 path at λ1.

In this embodiment, the service data may be borne on a plurality of OB paths at one wavelength, and the synchronization and cross-connection processing procedures are similar to the synchronization and cross-connection processing procedures when the service data is borne on one OB path at one wavelength, except that the service data added to the edge node C2N1 and the service data dropped at the edge node C2N10 are borne on a plurality of OB paths at one wavelengths, where the details of the specific synchronization and cross-connection processing procedures may not be described herein again.

In the data processing system of this embodiment, the nodes are connected through the OB paths. A plurality of OB paths exists on a port or ports of the node, so that the node may be connected to more nodes through the OB paths, and the number of available connections of the node is increased. Meanwhile, for one node, in a situation of having the same number of connections, the number of the ports of the node may be reduced, thereby reducing the volume, power consumption, and costs of the node. The OB paths for transferring the service data may be configured and relatively fixed, and the node performs the cross-connection process on the OB paths, thereby avoiding the problem of generation of data conflict on the optical layer due to lack of optical buffers in all optical switching. The node completes the synchronization process and the cross-connection process on the OB paths on the optical layer, thereby reducing the optical-to-electrical conversion, the electrical-to-optical conversion, and the electrical processing procedure, so as to reduce the power consumption, the volume, and the costs of the node.

In the embodiment of the data processing system, a special situation is described. The data processing system includes two nodes. Here, the two nodes respectively serve as the source node and the destination node, and transfer the service data by only using one OB path at one wavelength. The OB path bearing the service data is added to the source node, and after being sent to the destination node, the OB path is dropped at the destination node, thereby completing the procedure of transferring the service data. In the procedure, the two nodes of the data processing system do not need to perform the synchronization process and the cross-connection process on the OB path, and as long as the adding and the dropping procedure of the OB path are completed, the transferring of the service data is realized.

In an embodiment, the present invention further provides a data processing method, which includes the following steps.

Synchronization information and OB configuration information are generated.

A synchronization process is performed on OB paths at one or more wavelengths according to the synchronization information.

A cross-connection process is performed, according to the OB configuration information, on the OB paths, on which the synchronization process has been performed.

In the procedure of generating the synchronization information and the OB configuration information, an OB frame header clock is detected from a pre-separated signal; a frequency locking process and a delaying process are performed on the OB frame header clock to generate a new OB frame header clock, and further, a filtering process and a phase-locking process are performed on the OB frame header clock, where the synchronization information at least includes the OB frame header clock and the new OB frame header clock; a new OB time-slot clock is generated by using a start position of the new OB frame header clock as a reference; and the OB configuration information is generated according to preset OB path configuration information, the new OB frame header clock, and the generated new OB time-slot clock.

Alternatively, in the procedure of generating the synchronization information and the OB configuration information, the OB frame header clock and the OB time-slot clock are detected from the pre-separated signal; the frequency locking process and the delaying process are performed on the OB frame header clock and the OB time-slot clock to generate the new OB frame header clock and the new OB time-slot clock, and further, the filtering process and the phase-locking process are performed on the OB frame header clock, where the synchronization information includes at least the OB frame header clock and the new OB frame header clock; and the OB configuration information is generated according to the preset OB path configuration information, the new OB frame header clock, and the new OB time-slot clock.

In the procedure of performing the synchronization process on the OB paths at one or more wavelengths according to the synchronization information, array control information is generated according to the OB frame header clock and the new OB frame header clock; and an optical delay array is configured according to the array control information, and the synchronization process is performed on the OB paths at one or more wavelengths through the optical delay array.

In the procedure of performing, according to the OB configuration information, the cross-connection process on the OB paths, on which the synchronization process has been performed, the cross-connection process is performed, according to the OB configuration information, on optical fibers of the OB paths, on which the synchronization process has been performed.

Alternatively, in the procedure of performing, according to the OB configuration information, the cross-connection process on the OB paths, on which the synchronization process has been performed, the cross-connection process is performed, according to the OB configuration information, on wavelengths of the OB paths, on which the synchronization process has been performed.

Alternatively, in the procedure of performing, according to the OB configuration information, the cross-connection process on the OB paths, on which the synchronization process has been performed, the cross-connection process is performed, according to the OB configuration information, on the OB paths, on which the synchronization process has been performed.

Alternatively, in the procedure of performing, according to the OB configuration information, the cross-connection process on the OB paths, on which the synchronization process has been performed, the cross-connection process is performed, according to the OB configuration information, on the wavelengths of the OB paths, on which the synchronization process has been performed, and the cross-connection process is performed, according to the OB configuration information, on the OB paths, on which the synchronization process has been performed.

In this embodiment, frame headers of OB frames at different wavelengths, on which the synchronization process has been performed, remain in a relatively fixed phase relation, where the frame headers of the OB frames at different wavelengths may be aligned, or the OBs on the same position at different wavelengths, on which the synchronization process has been performed, remain in a relatively fixed phase relation, and the OBs on the same position at the different wavelengths may be aligned. In other words, the procedure of the synchronization process includes the following steps. The frame headers of the OB frames at the different wavelengths are aligned, or the OBs on the same position at the different wavelengths are aligned.

In an embodiment, the present invention further provides a data processing method, which includes the following steps. Nodes are connected by using OB paths at one or more wavelengths, where the nodes transfer service data through the OB paths.

Further, the method includes that the node performs a synchronization process and a cross-connection process on the OB paths bearing the service data at one or more wavelengths.

In the procedure that the node performs the synchronization process and the cross-connection process on the OB paths bearing the service data at one or more wavelengths, synchronization information and OB configuration information are generated; the synchronization process is performed on the OB paths at one or more wavelengths according to the synchronization information; and the cross-connection process is performed, according to the OB configuration information, on the OB paths, on which the synchronization process has been performed.

In this embodiment, frame headers of OB frames at different wavelengths, on which the synchronization process has been performed, remain in a relatively fixed phase relation, where the frame headers of the OB frames at different wavelengths may be aligned, or the OBs on the same position at different wavelengths, on which the synchronization process has been performed, remain in a relatively fixed phase relation, where the OBs on the same position at the different wavelengths may be aligned. In other words, the procedure of the synchronization process includes the following steps. The frame headers of the OB frames at the different wavelengths are aligned, or the OBs on the same position at the different wavelengths are aligned.

The steps in the embodiment of the data processing method are not limited to a specific time sequence. In addition, each module referred to in the data processing method is the same as that in the node and the data processing system, and the specific functions thereof may not be described herein again.

In the technical solution of the data processing method according to an embodiment of the present invention, the nodes are connected through the OB paths, and a plurality of OB paths exists on a port or ports of the node, so that the node may be connected to more nodes through a plurality of OB paths, thereby increasing the number of available connections of the node. Meanwhile, for one node, in the situation of having the same number of connections, the number of the ports of the node may be reduced, thereby reducing the volume, the power consumption, and the costs of the node. The OB paths bearing the service data may be configured and relatively fixed, and the node performs the cross-connection process on the OB paths, thereby avoiding the problem of generation of data conflict on the optical layer due to lack of optical buffers in all optical switching. The node completes the synchronization process and the cross-connection process on the OB paths on the optical layer, thereby reducing the optical-to-electrical conversion, the electrical-to-optical conversion, and the electrical processing procedure, so as to reduce the power consumption, the volume, and the costs of the node.

Finally, it should be noted that the above embodiments are merely provided for elaborating the technical solutions of the present invention, but not intended to limit the present invention. Person having ordinary skill in the art should understand that although the present invention has been described in detail with reference to the foregoing embodiments, modifications or equivalent replacements can be made to the technical solutions without departing from the principle and scope of the present invention. Any modification, equivalent replacement, or improvement made without departing from the principle of the present invention should fall within the scope of the present invention.

What is claimed is:

1. A node, comprising:
   a control module, configured to generate synchronization information and Optical Burst (OB) configuration information;
   at least one synchronization processing module, configured to perform a synchronization process on OB paths at one or more wavelengths according to the synchronization information; and
   a cross-connection module, configured to perform, according to the OB configuration information, a cross-connection process on the OB paths, on which the synchronization process has been performed; wherein the control module comprises:
   at least one detecting unit, configured to detect an OB frame header clock from a pre-separated signal, and send the OB frame header clock to the synchronization processing module;
   a generating unit, configured to perform a frequency locking process and a delaying process on the OB frame header clock to generate a new OB frame header clock, and send the new OB frame header clock to the synchronization processing module;
   an OB time-slot clock generating module, configured to generate a new OB time-slot clock by using a start position of the new OB frame header clock as a reference; and
   a configuration information generating unit, configured to generate the OB configuration information according to preset OB path configuration information, the new OB frame header clock, and the new OB time-slot clock, and send the OB configuration information to the cross-connection module,
   wherein the synchronization information at least comprises the OB frame header clock and the new OB frame header clock.

2. The node according to claim 1, wherein the control module further comprises:
- at least one optical power detecting unit, configured to perform an optical-to-electrical conversion on a received optical power signal, and output an optical power envelope signal to the detecting unit, wherein the pre-separated signal is the optical power envelope signal.

3. The node according to claim 1, wherein the pre-separated signal is a control channel, and the node further comprises:
- at least one control channel processing module, configured to extract control channel information from the control channel; and
- at least one control channel generating module, configured to perform an updating process on the control channel information, and generate a new control channel according to the updated control channel information by using the new OB frame header clock and the new OB time-slot clock as references.

4. The node according to claim 1, wherein the synchronization processing module comprises:
- an array control unit, configured to generate array control information according to the OB frame header clock and the new OB frame header clock; and
- an array unit, configured to configure an optical delay array according to the array control information, perform the synchronization process on the OB paths at one or more wavelengths through the optical delay array, and send the OB paths, on which the synchronization process has been performed, to the cross-connection module.

5. The node according to claim 1, further comprising:
- a client side service processing module, configured to perform a detecting process and a forwarding process on service data;
- a burst container adaptation module, configured to encapsulate the processed service data in burst containers or decapsulate the service data encapsulated in the burst containers to generate the service data; and
- an OB framing module, configured to adapt, according to the new OB frame header clock and the new OB time-slot clock, the burst containers with the encapsulated service data to the OBs or process the received OBs to generate the burst containers with the encapsulated service data, wherein the OBs are transmission entities of the OB paths.

6. The node according to claim 5, further comprising:
- a burst receiver, configured to perform an optical-to-electrical conversion on the OB paths, on which the cross-connection process has been performed, and send the OB paths to the OB framing module; and
- a burst transmitter, configured to perform an electrical-to-optical conversion on the OBs configured by the OB framing module, and send the OBs to the cross-connection module.

7. A node, comprising:
- a control module, configured to generate synchronization information and Optical Burst (OB) configuration information;
- at least one synchronization processing module, configured to perform a synchronization process on OB paths at one or more wavelengths according to the synchronization information; and
- a cross-connection module, configured to perform, according to the OB configuration information, a cross-connection process on the OB paths, on which the synchronization process has been performed; wherein the control module comprises:
- at least one detecting unit, configured to detect an OB frame header clock and an OB time-slot clock from a pre-separated signal, and send the OB frame header clock to the synchronization processing module;
- a generating unit, configured to perform a frequency locking process and a delaying process on the OB frame header clock and the OB time-slot clock to generate a new OB frame header clock and a new OB time-slot clock, and send the new OB frame header clock to the synchronization processing module; and
- a configuration information generating unit, configured to generate the OB configuration information according to preset OB path configuration information, the new OB frame header clock, and the new OB time-slot clock, and send the OB configuration information to the cross-connection module,
- wherein the synchronization information at least comprises the OB frame header clock and the new OB frame header clock.

8. The node according to claim 7, wherein the control module further comprises:
- at least one optical power detecting unit, configured to perform an optical-to-electrical conversion on a received optical power signal, and output an optical power envelope signal to the detecting unit, wherein the pre-separated signal is the optical power envelope signal.

9. The node according to claim 7, wherein the pre-separated signal is a control channel, and the node further comprises:
- at least one control channel processing module, configured to extract control channel information from the control channel; and
- at least one control channel generating module, configured to perform an updating process on the control channel information, and generate a new control channel according to the updated control channel information by using the new OB frame header clock and the new OB time-slot clock as references.

10. The node according to claim 7, wherein the synchronization processing module comprises:
- an array control unit, configured to generate array control information according to the OB frame header clock and the new OB frame header clock; and
- an array unit, configured to configure an optical delay array according to the array control information, perform the synchronization process on the OB paths at one or more wavelengths through the optical delay array, and send the OB paths, on which the synchronization process has been performed, to the cross-connection module.

11. A data processing system, comprising:
- at least two nodes, connected by using Optical Burst (OB) paths at one or more wavelengths, configured to transfer service data through the OB paths, and further configured to perform a synchronization process and a cross-connection process on the OB paths bearing the service data at one or more wavelengths, each of the at least two nodes comprising:
- a control module, configured to generate synchronization information and OB configuration information;
- at least one synchronization processing module, configured to perform the synchronization process on the OB paths at one or more wavelengths according to the synchronization information; and a cross-connection module, configured to perform the cross-connection process on the OB paths, on which the synchronization process has been performed, according to the OB configuration information; wherein the control module comprises:

at least one detecting unit, configured to detect an OB frame header clock from a pre-separated signal, and send the OB frame header clock to the synchronization processing module;

a generating unit, configured to perform a frequency locking process and a delaying process on the OB frame header clock to generate a new OB frame header clock, and send the new OB frame header clock to the synchronization processing module;

an OB time-slot clock generating module, configured to generate a new OB time-slot clock by using a start position of the new OB frame header clock as a reference; and a configuration information generating unit, configured to generate the OB configuration information according to preset OB path configuration information, the new OB frame header clock, and the new OB time-slot clock, and send the OB configuration information to the cross-connection module, wherein the synchronization information at least comprises the OB frame header clock and the new OB frame header clock.

12. A data processing system, comprising:

at least two nodes, connected by using Optical Burst (OB) paths at one or more wavelengths, configured to transfer service data through the OB paths, and further configured to perform a synchronization process and a cross-connection process on the OB paths bearing the service data at one or more wavelengths, each of the at least two nodes comprising:

a control module, configured to generate synchronization information and OB configuration information;

at least one synchronization processing module, configured to perform the synchronization process on the OB paths at one or more wavelengths according to the synchronization information; and a cross-connection module, configured to perform the cross-connection process on the OB paths, on which the synchronization process has been performed, according to the OB configuration information; wherein the control module comprises:

at least one detecting unit, configured to detect an OB frame header clock and an OB time-slot clock from a pre-separated signal, and send the OB frame header clock to the synchronization processing module;

a generating unit, configured to perform a frequency locking process and a delaying process on the OB frame header clock and the OB time-slot clock to generate a new OB frame header clock and a new OB time-slot clock, and send the new OB frame header clock to the synchronization processing module; and a configuration information generating unit, configured to generate the OB configuration information according to preset OB path configuration information, the new OB frame header clock, and the new OB time-slot clock, and send the OB configuration information to the cross-connection module, wherein the synchronization information at least comprises the OB frame header clock and the new OB frame header clock.

* * * * *